United States Patent
Wang et al.

(10) Patent No.: US 10,382,230 B2
(45) Date of Patent: Aug. 13, 2019

(54) SYSTEM AND METHOD FOR CHANNEL ESTIMATION IN MMWAVE COMMUNICATIONS EXPLOITING JOINT AOD-AOA ANGULAR SPREAD

(71) Applicant: Mitsubishi Electric Research Laboratories, Inc., Cambridge, MA (US)

(72) Inventors: Pu Wang, Cambridge, MA (US); Milutin Pajovic, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 27 days.

(21) Appl. No.: 15/475,229

(22) Filed: Mar. 31, 2017

(65) Prior Publication Data

US 2018/0287822 A1    Oct. 4, 2018

(51) Int. Cl.
    *H04L 1/00*      (2006.01)
    *H04W 24/06*     (2009.01)
    *H04L 25/02*     (2006.01)

(52) U.S. Cl.
    CPC ........ *H04L 25/0202* (2013.01); *H04L 25/023* (2013.01); *H04L 25/0204* (2013.01);
    (Continued)

(58) Field of Classification Search
    CPC .............. H04L 25/0202; H04W 24/06; H04W 72/0466
    See application file for complete search history.

(56) References Cited

U.S. PATENT DOCUMENTS 9,473,229 B2    10/2016 Yin et al.
9,641,357 B1 *   5/2017 Pajovic ............... H04B 7/0626
(Continued)

FOREIGN PATENT DOCUMENTS

WO       2016138430 A1    9/2016

OTHER PUBLICATIONS

Roi Mendez-Rial in "Channel Estimation and Hybrid Combining for mmWave: Phase Shifters or Switches," Conference: 2015 Information Theory and Applications Workshop (ITA).
(Continued)

*Primary Examiner* — Charles C Jiang
*Assistant Examiner* — Ryan C Kavleski
(74) *Attorney, Agent, or Firm* — Gennadiy Vinokur; James McAleenan; Hironori Tsukamoto

(57) ABSTRACT

Devices and methods for decoding a symbol transmitted over a millimeter wave (mmWave) channel. Receiving a test symbol transmitted over the mmWave channel. Estimating channel state information (CSI) of the mmWave channel using a block sparse signal recovery on the test symbol, according to a multi-dimensional spreading model with statistics on multi-dimensional paths. The multi-dimensional spreading model with statistics on multi-dimensional paths include an angle of departure (AoD), angle of arrival (AoA), and a path spread for the AoD and a path spread for the AoA, propagating in the mmWave channel. Receiving a symbol over the mmWave channel, and decoding the symbol using the CSI, wherein steps of the method are performed by a processor of a receiver.

20 Claims, 15 Drawing Sheets

(52) U.S. Cl.
CPC ........ *H04L 25/024* (2013.01); *H04L 25/0224* (2013.01); *H04W 24/06* (2013.01); *H04L 1/0026* (2013.01)

(56) References Cited

U.S. PATENT DOCUMENTS

| | | | | |
|---|---|---|---|---|
| 9,948,377 | B1* | 4/2018 | Kim | ......................... H04B 7/02 |
| 2011/0207489 | A1* | 8/2011 | DeLuca | ............ H04W 72/1205 |
| | | | | 455/509 |
| 2013/0036084 | A1* | 2/2013 | Lee | .......................... H04B 1/66 |
| | | | | 706/52 |
| 2014/0140375 | A1 | 5/2014 | Muqaibel et al. | |
| 2015/0351135 | A1* | 12/2015 | Schmidt | ................ H04W 76/10 |
| | | | | 455/450 |
| 2016/0182137 | A1* | 6/2016 | Onggosanusi | ....... H04B 7/0469 |
| | | | | 370/329 |
| 2016/0211895 | A1* | 7/2016 | Onggosanusi | ....... H04B 7/0404 |
| 2017/0005715 | A1 | 1/2017 | Cezanne et al. | |
| 2017/0295508 | A1* | 10/2017 | Stirling-Gallacher | ...................... H04L 5/0035 |
| 2018/0176065 | A1* | 6/2018 | Deng | ................... H04B 7/0695 |

OTHER PUBLICATIONS

Muqaibel et al., "Practical Application of Compressive Sensing to Ultra Wideband Channels," 1ET Communications, The Institution of Engineering and Technology, GB. vol. 6, No. 16. Nov. 6, 2012. pp. 2534-2542.

Mo Jianhua et al., "Channel Estimation in Millimeter Wave MIMO Systems with One Bit Quantization," 2014 48th ASILOMAR Conference on Signals, Systems and Computers, IEEE, Nov. 2, 2014. pp. 957-961.

Cheng Xiantao et al., "Ultrawideband Channel Estimation: A Bayesian Compressive Sensing Stratefy Based on Statistical Sparsity," IEEE Transactions on Vehicular Technology, IEEE Service Center, Piscataway, NJ, US, vol. 64, No. 5, May 1, 2015. pp. 1819-1832.

* cited by examiner (b) 1-D coupled pattern (a) 2-D coupled pattern

SYSTEM AND METHOD FOR CHANNEL ESTIMATION IN MMWAVE COMMUNICATIONS EXPLOITING JOINT AOD-AOA ANGULAR SPREAD

FIELD

The present disclosure relates generally to communications systems, and more particularly to channel estimation in millimeter wave (mmWave) communication systems, exploiting joint angle-of-departure (AoD) and angle-of-arrival (AoA) Angular Spread.

BACKGROUND

Millimeter Waves (mmWaves) are radio waves with wavelength in the range of 1 millimeter (mm)-10 mm, which corresponds to a radio frequency of 30 GigaHertz (GHz)-300 GHz. Per the definition by the International Telecommunications Union (ITU), these frequencies are also referred to as the Extremely High Frequency (EHF) band.

The mmWaves exhibit unique propagation characteristics. For example, compared with lower frequency radio waves, mmWaves suffer higher propagation loss, have a poorer ability to penetrate objects, such as buildings, walls, foliage, and are more susceptible to atmosphere absorption, deflection and diffraction due to particles (e.g., rain drops) in the air. On the other hand, due to the smaller wavelengths of the mmWaves, more antennas may be packed in a relatively small area, thereby allowing for the implementation of a high-gain antenna in small form factor.

The mmWaves have been less utilized than the lower frequency radio waves. A vast amount of spectrum is available in the mmWave band. For example, the frequencies around 60 GHz, which are typically referred to as the 60 GHz band, are available as unlicensed spectrum in most countries.

In wireless communications, channel state information (CSI) refers to known channel properties of a communication link. This information describes how a signal propagates from the transmitter to the receiver and represents the combined effect of, for example, scattering, fading, and power decay with distance. The CSI makes it possible to adapt transmissions to current channel conditions for achieving reliable communication with high data rates in multiantenna systems. The CSI needs to be estimated at the receiver, but can be quantized and fed back to the transmitter (although reverse-link estimation is possible). The transmitter and receiver can have different CSI.

Accurate CSI estimation is desirable in order to take advantage of the potential of mmWave network capacity. In particular, with accurate CSI estimation, CSI can be exploited for optimum or quasi-optimum precoder and equalizer designs with the purpose of maximizing system performance. A number of different methods are developed for estimating CSI. However, the CSI estimation methods developed for lower frequency radio waves are not always suitable for mmWaves channel estimation due to differences in the physical characteristics of the waves.

One method, described by Roi Mendez-Rial in "Channel Estimation and Hybrid Combining for mmWave: Phase Shifters or Switches," estimates the mmWave channel using the sparse recovery formulation of the channel. However, such a formulation does not accurately represent different properties of the mmWave channel, which makes this method less accurate.

SUMMARY

Embodiments of the present disclosure provide for devices and methods relating generally to communications systems, and more particularly to channel estimation in millimeter wave (mmWave) communication systems, exploiting joint angle-of-departure (AoD) and angle-of-arrival (AoA) angular spread, and potentially for the elevation spread as well.

Specifically, the present disclosure is based on a recognition that the millimeter wave (mmWave) channel has several specific properties for propagation of mmWaves. In contrast with the lower frequency radio waves, the mmWave channel is sparse in the number of arrivals of mmWaves impinging upon the receiver array. In addition, the propagated mmWaves are spread in angular (AoA and AoD) domain and in the elevation domain, and can potentially exhibit a specific power profile. Accordingly, the present disclosure is based on improving the performance of mmWave channel estimation performance by exploiting the different properties of mmWaves propagation, in particular, by exploiting joint AoD-AoA Angular Spread.

We learned through experimentation, when looking to further the sparse nature of the channel, that we could take advantage of the joint spatial spreads of channel path clusters in the AoD and AoA domains. For example, the spatial spread induces a two-dimensional block sparse mmWave channel gain matrix. By taking into account the sparse scattering nature and, the two-dimensional block sparsity, we can obtain a two-dimensional coupled sparse Bayesian learning algorithm which can treat channel gain of each path as a random variable, and assumes a two-dimensional coupled building block to favor block-sparse solutions without knowing the block pattern a priori. The coupled sparse Bayesian learning algorithm can include two steps and iterates between these two step: first, is the Bayesian estimation of the channel gain matrix followed by, the second, of iteratively updating the prior variance (or, equivalently, the channel path power) by using the expectation-maximization (EM) algorithm.

For example, one embodiment of the present disclose receives a test symbol transmitted over the mmWave channel. Then, estimates the channel state information (CSI) of the mmWave channel using a block sparse signal recovery on the test symbol according to a multi-dimensional spreading model with statistics on multi-dimensional paths. Wherein the multi-dimensional spreading model with statistics on multi-dimensional paths include an angle of departure (AoD), angle of arrival (AoA), and a path spread for the AoD and a path spread for the AoA, propagating in the mmWave channel. Receiving a symbol over the mmWave channel, and decoding the symbol using the CSI.

However, other embodiments of the present disclose may use other statistics on multi-dimensional paths which include a path spread for an elevation and a path spread for a delay. Additionally, some embodiments of the present disclosure may include the block sparse signal recovery that utilizes different types of methods, such as: a group least absolute shrinkage and selection operator (LASSO) method; at least one group greedy method for example the block orthogonal match pursuit (block OMP); or at least one Bayesian inference method that captures a block sparsity. Further still, some embodiments of the present disclosure include determining a type of an environment for propagating the mmWave in the mmWave channel, and then selects the multi-dimensional spreading model of the mmWave channel that corresponds to the type of the environment for propagating the mmWave.

Some embodiments of the present disclosure can be based on realization that the spread of the mmWaves can be estimated in dependence on the environment of the mmWave channel. For example, the spread of the mmWaves is similar for mmWave channels in different office buildings, but different from the mmWave channels in residential areas. Thus, knowing the environment of the mmWave channel allows knowing the probabilistic distribution of the spread of the mmWaves in the channel.

In addition, coefficients of channel state information are complex Gaussian distributed with zero mean and an unknown variance such as a channel power. Such that the support and coefficients of the state information are determined by a coupled sparse Bayesian learning algorithm for the mmWave channel estimation while using the joint AoD and AoA angular spread. Wherein the coupled sparse Bayesian learning algorithm uses at least one coupling function, to use features of the mmWave channel, such as a smooth decay of a channel path power along the AoA or AoD domain.

According to an embodiment of the present disclosure, a method for decoding a symbol transmitted over a millimeter wave (mmWave) channel. The method including receiving a test symbol transmitted over the mmWave channel.

Estimating channel state information (CSI) of the mmWave channel using a block sparse signal recovery on the test symbol, according to a multi-dimensional spreading model with statistics on multi-dimensional paths. The multi-dimensional spreading model with statistics on multi-dimensional paths include an angle of departure (AoD), angle of arrival (AoA), and a path spread for the AoD and a path spread for the AoA, propagating in the mmWave channel. Receiving a symbol over the mmWave channel, and decoding the symbol using the CSI, wherein steps of the method are performed by a processor of a receiver.

According to an embodiment of the present disclosure, a receiver for receiving and decoding symbols transmitted over a millimeter wave (mmWave) channel. The receiver includes a set of antennas to receive symbols transmitted over the mmWave channel. A front end to convert the symbols into a test symbol and a data symbol. A processor to estimate channel state information (CSI) of the mmWave channel using a block sparse signal recovery on the test symbol according to a multi-dimensional spreading model with statistics on multi-dimensional paths including an angle of departure (AoD), angle of arrival (AoA), and a path spread for the AoD and a path spread for the AoA, propagating in the mmWave channel. A decoder to decode the symbol using the CSI.

According to an embodiment of the present disclosure, a computer implemented method for decoding a symbol transmitted over a millimeter wave (mmWave) channel. The method including estimating channel state information (CSI) of the mmWave channel using a block sparse signal recovery on the test symbol according to a multi-dimensional spreading model with statistics on multi-dimensional paths including an angle of departure (AoD), angle of arrival (AoA), and a path spread for the AoD and a path spread for the AoA, propagating in the mmWave channel. Decoding a symbol received over the mmWave channel by a receiver using the CSI, wherein steps of the method are performed by a processor of the receiver.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3B illustrates scenario 1, two separated path clusters with AoA spreads larger than AoD spreads; and FIG. 3C, illustrates scenario 2, two intersecting path clusters with one spreading over the AoD and the other spreading along the AoA, according to some embodiments of the present disclosure;

Figure 1A:
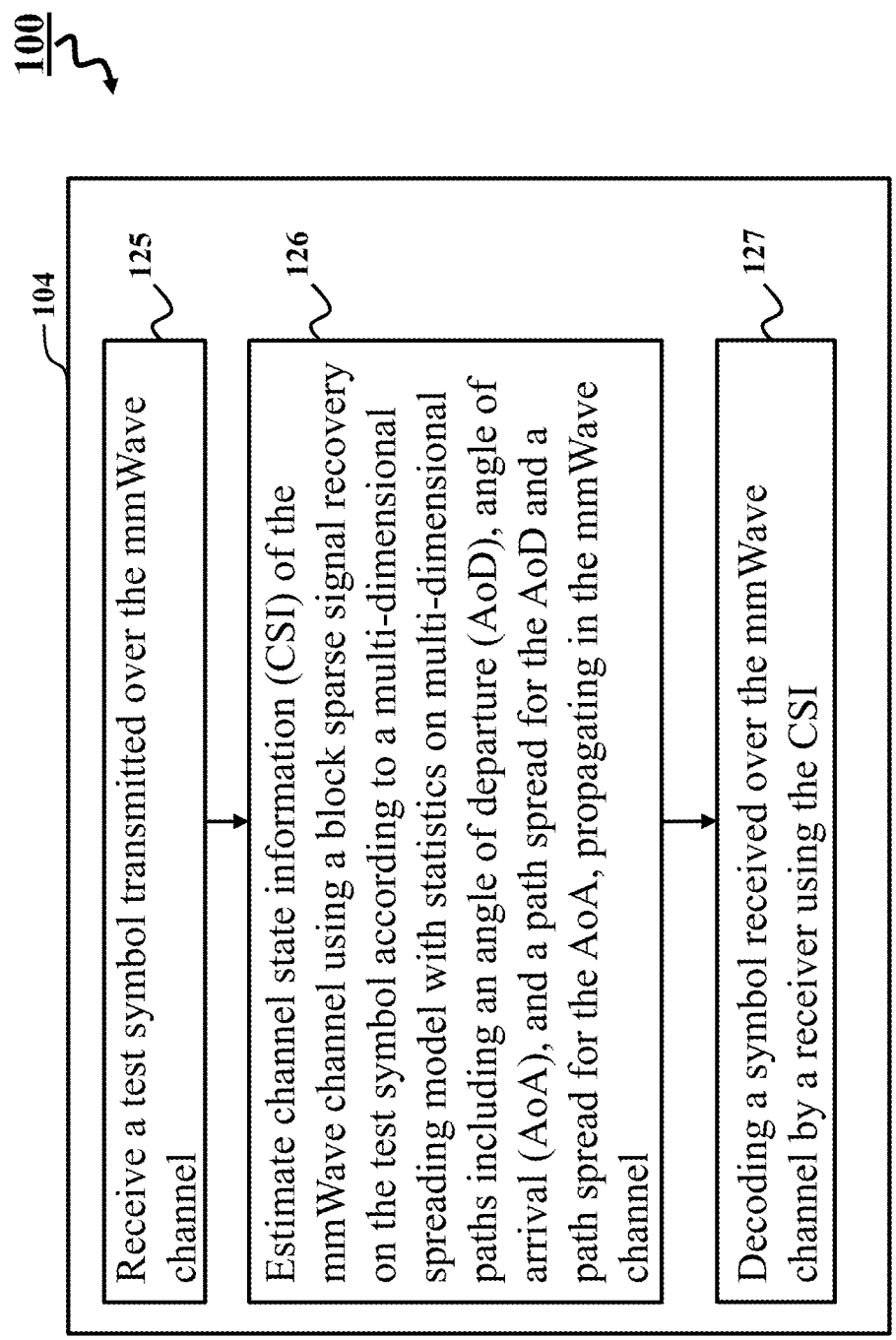
FIG. 1A shows a block diagram of methods for a wireless communication system in accordance with one embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure provide for devices and methods relating generally to communications systems, and more particularly to channel estimation in millimeter wave (mmWave) communication systems, exploiting joint angle-of-departure (AoD) and angle-of-arrival (AoA) Angular Spread.

Specifically, the present disclosure is based on a recognition that the millimeter wave (mmWave) channel has several specific properties for propagation of mmWaves. In contrast with the lower frequency radio waves, the mmWave channel is sparse in the number of arrivals of mmWaves impinging upon the receiver array. In addition, the propagated mmWaves are spread in angular domain and can potentially exhibit a specific power profile. Accordingly, the present disclosure is based on improving the performance of mmWave channel estimation performance by exploiting the different properties of mmWaves propagation, in particular, by exploiting joint AoD-AoA Angular Spread.

We learned through experimentation, when looking to further the sparse nature of the channel, that we could take advantage of the joint spatial spreads of channel path clusters in the AoD and AoA domains. For example, the spatial spread induces a two-dimensional block sparse mmWave channel gain matrix. By taking into account the sparse scattering nature and, the two-dimensional block sparsity, we can obtain a two-dimensional coupled sparse Bayesian learning algorithm which can treat channel gain of each path as a random variable, and assumes a two-dimensional coupled building block to favor block-sparse solutions without knowing the block pattern a priori. The coupled sparse Bayesian learning algorithm can include two steps and iterates between these two step: first, is the Bayesian estimation of the channel gain matrix followed by, the second, of iteratively updating the prior variance (or, equivalently, the channel path power) by using the expectation-maximization (EM) algorithm.

For example, one embodiment of the present disclose receives a test symbol transmitted over the mmWave channel. Then, estimates the channel state information (CSI) of the mmWave channel using a block sparse signal recovery on the test symbol according to a multi-dimensional spreading model with statistics on multi-dimensional paths. Wherein the multi-dimensional spreading model with statistics on multi-dimensional paths include an angle of departure (AoD), angle of arrival (AoA), and a path spread for the AoD and a path spread for the AoA, propagating in the mmWave channel. Receiving a symbol over the mmWave channel, and decoding the symbol using the CSI.

However, other embodiments of the present disclose may use other statistics on multi-dimensional paths which include a path spread for an elevation and a path spread for a delay. Additionally, some embodiments of the present disclosure may include the block sparse signal recovery that utilizes different types of methods, such as: a group least absolute shrinkage and selection operator (LASSO) method; at least one group greedy method for example the block orthogonal match pursuit (block OMP); or at least one Bayesian inference method that captures a block sparsity. Further still, some embodiments of the present disclosure include determining a type of an environment for propagating the mmWave in the mmWave channel, and then selects the multi-dimensional spreading model of the mmWave channel that corresponds to the type of the environment for propagating the mmWave.

Some embodiments of the present disclosure can be based on realization that the spread of the mmWaves can be estimated probabilistically in dependence on the environment of the mmWave channel. For example, the spread of the mmWaves is probabilistically similar for mmWave channels in different office buildings, but probabilistically different from the mmWave channels in residential areas. Thus, knowing the environment of the mmWave channel allows knowing the probabilistic distribution of the spread of the mmWaves in the channel.

In addition, the probability of sparse distribution of the mmWaves can also depend on the environment of the channel and can be predetermined. Because different properties of the mmWave propagation can be determined probabilistically, some embodiments frame the channel estimation problem as a Bayesian inference problem. Specifically, coefficients of state information can be probabilistic, in such that the channel gain element is complex Gaussian distributed with zero mean and an unknown variance such as a channel power. Such that the support and coefficients of the state information are determined by a coupled sparse Bayesian learning algorithm for the mmWave channel estimation while using the joint AoD and the AoA angular spread. Wherein the coupled sparse Bayesian learning algorithm uses at least one coupling function, to use features of the mmWave channel, such as a smooth decay of a channel path power along the AoA or AoD domain.

FIG. 1A shows a block diagram of method steps of an embodiment for a wireless communication system in accordance with one embodiment of the present disclosure. The computer implemented method 100 is for decoding a symbol transmitted over a millimeter wave (mmWave) channel by a first communication device, and begins with step 125 of FIG. 1A, that includes a second communication device 104 receiving a test symbol transmitted over the mmWave channel.

Step 126 of FIG. 1A for method 100 includes the communication device 104 estimating the channel state information (CSI) of the mmWave channel using a block sparse signal recovery on the test symbol according to a multi-dimensional spreading model with statistics on multi-dimensional paths including an angle of departure (AoD), angle of arrival (AoA), and a path spread for the AoD and a path spread for the AoA, propagating in the mmWave channel.

Step 127 of FIG. 1A for method 100 includes encoding a symbol received over the mmWave channel by a receiver using the CSI.

Figure 1B:
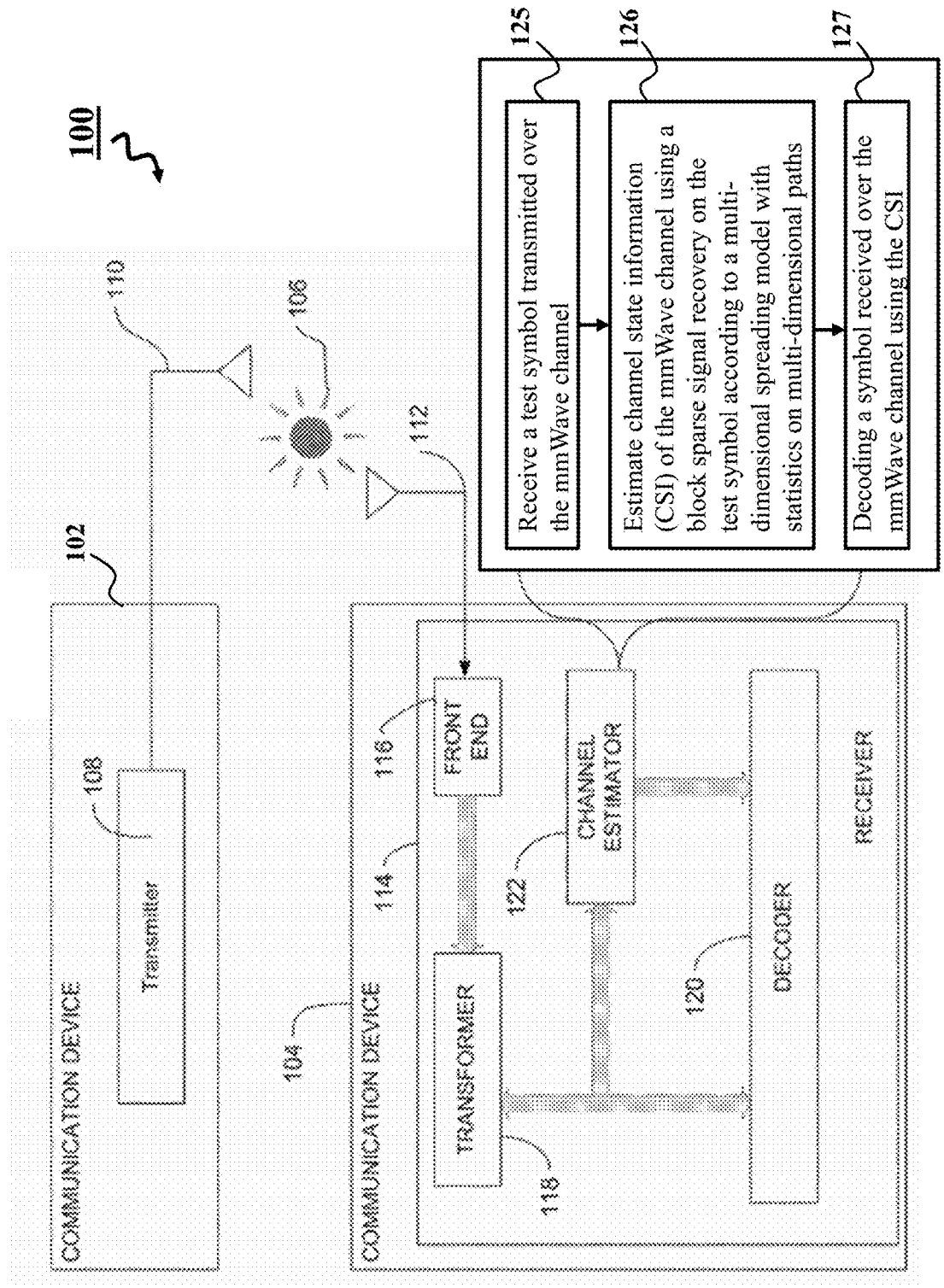
FIG. 1B shows a schematic of a wireless communication system 100 in accordance with one embodiment of the present disclosure.

FIG. 1B shows a schematic of a wireless communication system 100 in accordance with one embodiment of the present disclosure. The communication system 100 includes the first communication device 102 able to communicate with the second communication device 104 over a communication channel 106. The communication channel 106 is a millimeter wave (mmWave) channel. In various industries, the mmWaves band refers to frequencies between 6 GigaHertz (GHz) and 300 GHz. For example, the first communication device 102 and/or the second communication device 104 can communicate with each other in accordance with the 802.11ad standard.

For example, the device 102 includes Ntx antennas 110 and the device 104 includes Nrx antennas 112 to transmit a single data stream over the channel 106 by a single antenna or over multiple antennas using beamforming and/or spatial multiplexing. The single data stream can be split into multiple sub-data streams that are then individually and simultaneously transmitted over the same communication channel such as channel 106 from the multiple antennas. Although the scope of the present disclosure is not limited in this respect, types of antennas used by various embodiments for antennas 110 and/or 112 include but are not limited to internal antenna, dipole antenna, omni-directional antenna, a monopole antenna, an end fed antenna, a circularly polarized antenna, a micro-strip antenna, a diversity antenna and the like.

The communication device 102 includes a transmitter 108 to transmit a beam-formed transmission by transmitting the data stream via Ntx antennas 110, respectively. The communication device 104 includes a receiver 114 to receive the data stream over the channel 106 via the Nrx antennas 112. The received signal may include symbols corresponding, for example, to symbols of the signal transmitted by transmitter 108.

In some embodiments, the receiver 114 includes a front end 116 and/or a transformer 118. The front end 116 can include any suitable front end module to convert a time-domain signal received from antenna 112 into a time-domain signal of a format suitable for transformer 118. Transformer 118 may transform the signal into a plurality of different types of signals that are suitable for a decoder 120 or a channel estimator 122. For example, the frond end can convert the received signal into a symbol suitable for the decoding.

The receiver 114 also includes a channel estimator 122 to generate a signal representing channel estimation. The receiver 114 can also include a decoder 120 to decode the received signal and to generate signal representing an estimation of the signal transmitted by the device 102. The channel estimator 122 uses a probabilistic model for the mmWave propagation in the environment of the channel 106.

In various embodiments of the present disclosure the channel estimator 122 is a probabilistic estimator that frames the channel estimation problem as a Bayesian inference problem using a probabilistic model 123 of the mmWave channel 106. Some embodiments of the present disclosure are based on recognition that mmWave channel has several specific properties for propagation of mmWaves. In contrast with the lower frequency radio waves, the mmWave channel is sparse in the number of arrivals of mmWaves impinging upon the receiver array. In addition, the propagated mmWaves are spread in angular domain and can potentially exhibit a specific power profile.

Unfortunately, it is difficult to determine the properties of the mmWave propagation deterministically. However, some embodiments of the present disclosure are based on realization that those properties can be determined probabilistically in dependence on the environment of the mmWave channel. For example, the sparsity and/or the spread of the mmWaves are probabilistically similar for mmWave channels in different office buildings, but probabilistically different from the mmWave channels in residential areas. Thus, knowing the environment of the mmWave channel allows knowing the probability of different properties of mmWave propagation.

Due to the spread, each or some of the mmWaves are received as a cluster of waves. To that end, some embodiments of the present disclosure determine the statistics on the properties of the mmWave propagation as an equivalent to the statistics on the cluster of the mmWaves. For example, in various embodiments, the probabilistic model 123 includes one or combination of statistics 125 on paths of propagation of the mmWaves in the mmWave channel and statistics 126 on spread of mmWaves propagating in the mmWave channel. In some embodiments, the probabilistic model 123 also includes statistics 127 on power profile of the mmWaves modeling the intensity of mmWaves across their respective angular spreads in the channel 106. Because different properties of the mmWave propagation can be determined probabilistically, some embodiments frame the channel estimation problem as a Bayesian inference problem.

Figure 1C:
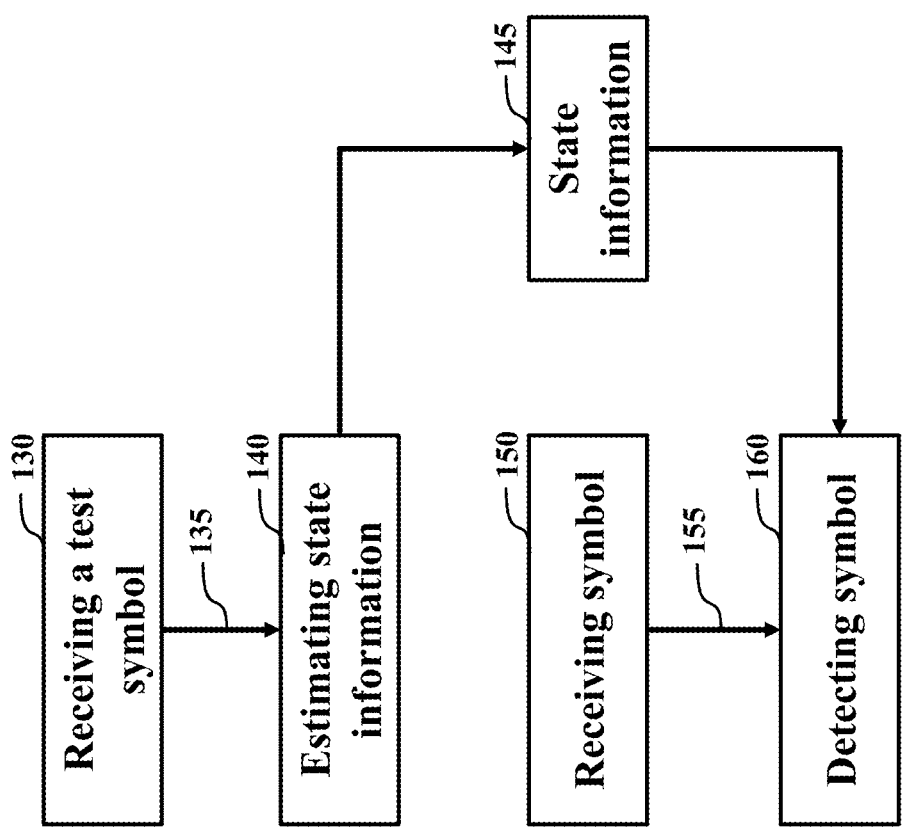
FIG. 1C shows a block diagram of a method for decoding a symbol transmitted over the mmWave channel according to one embodiment of the present disclosure.

FIG. 1C shows a block diagram of a method for decoding a symbol transmitted over the mmWave channel according to one embodiment of the present disclosure. The method receives 130 a test symbol 135 transmitted over the mmWave channel and estimates 140 state information 145 of the mmWave channel using a Bayesian inference on the test symbol 135. The value of the test symbol is known and the estimation is performed according to a probabilistic model 123 of the mmWave channel that includes statistics on paths 125 and spread 126 of mmWaves propagating in the mmWave channel. When the method receives 150 a symbol 155, e.g., a data symbol, the method detects 160 the symbol 155 using the state information 145 of the mmWave channel. The steps of the method can be performed by a processor of a receiver.

Figure 2:
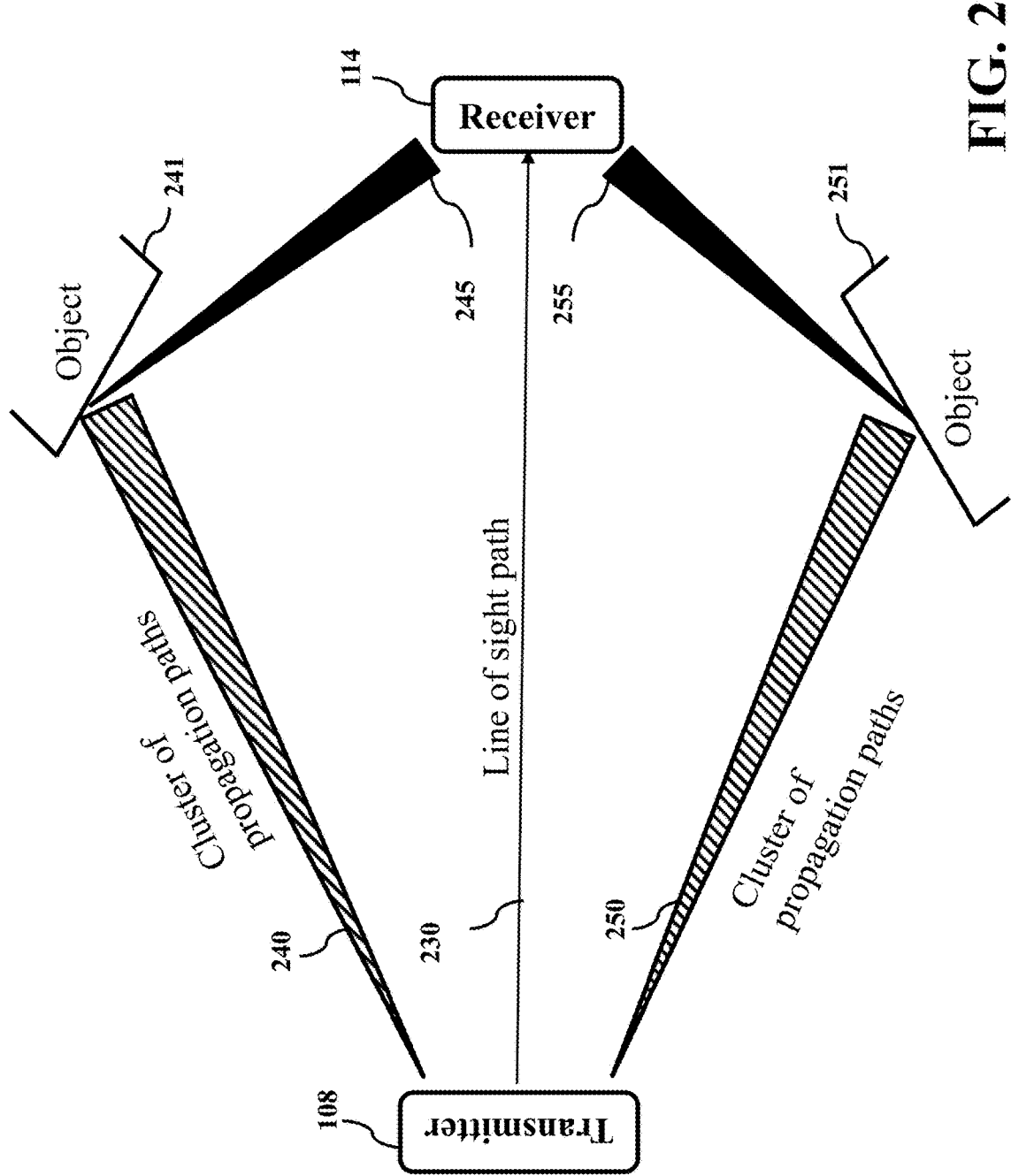
FIG. 2 shows schematic illustrating principles of propagation path clusters of the mmWaves in the mmWave channel employed by various embodiments of the present disclosure.

FIG. 2 shows schematic illustrating principles of propagation of the mmWaves in the mmWave channel employed by various embodiments of the present disclosure. For example, a signal sent from the transmitter 108 reaches the receiver 114 via few cluster of paths 230, 240 and 250. Since the wavelengths of the electro-magnetic waves in the mmWave system are likely comparable with the roughness of the object 241, 251 surfaces that bounce off the waves, the departures at the transmitter and the arrivals at the receiver are likely spread in the angular domain 240, 245, 250, 255. This feature has been confirmed in a number of reported measurement campaigns and is part of the existing standard IEEE 802.11ad for indoor mmWave communications at 60 GHz. Some embodiments of the present disclosure exploit this observation to devise an enhanced channel estimation method.

Some embodiments of the present disclosure are based on recognition that the mmWaves propagating in the mmWave channel are spread upon arrivals and departures, such that the mmWaves are detected as clusters of the mmWaves at the receiver. Due to the clustering, the statistics of the paths of mmWaves include statistics on locations of the clusters in a space of propagation of the mmWaves, and the statistics on the spread of mmWaves include statistics on a spread density of the cluster.

Figure 3A:
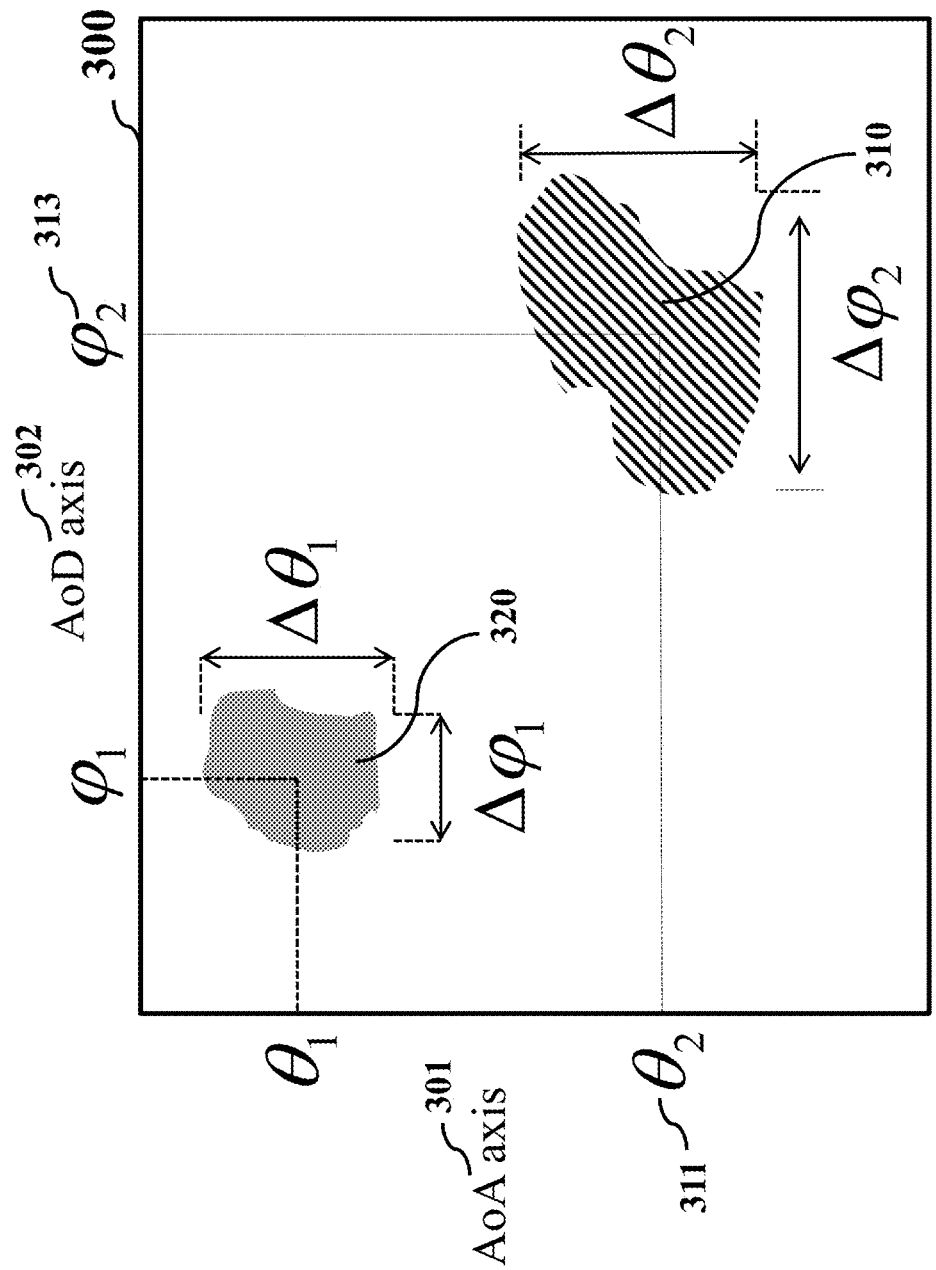
FIG. 3A shows a schematic of various metrics of statistic in the space of propagation of the mmWaves, according to some embodiments of the present disclosure.

FIG. 3A shows a schematic of various metrics of statistics in the space of propagation of the mmWaves according to some embodiments of the present disclosure. For example, the space of propagation of the mmWaves can be represented as a Carterisan product of the set of possible angles of the directions of departure (DoD) of the mmWaves and angles of the directions of arrivals (DoA) of the mmWaves.

For example, one domain of the space of propagation in mmWave channel is a virtual angular domain, pictorially shown in FIG. 3A in the case where, without loss of generality, both transmitter and receiver employ vertical line arrays of antennas.

To arrive to a virtual angular domain representation of a channel in this specific example, we first assume that channel between each transmitter antenna element and each receiver antenna element is a flat fading channel, and thus represented via a single complex gain. All complex gain coefficients, corresponding to all possible pairs of transmitter and receiver antenna elements, are formatted into a channel matrix H, such that (i,j) entry in H represents a channel gain between the $i^{th}$ antenna element on the receiver side and the $j^{th}$ antenna element on the transmitter side.

Specifically, consider a mmWave communication system with $N_T$ transmitters at the BS and $N_R$ receivers at MS. At time instant k, the BS applies a precoder/beamformer $p_k$ to transmit a symbol s. Without loss of generality, s=1. Correspondingly, the MS applies a combiner $q_k$ to generate the received signal $y_k$:

$$y_k = \sqrt{\rho} q_k^H H p_k s + q_k^H v, \quad k=1,2,\ldots,K, \qquad (1)$$

where $\rho$ is the average transmitted power, $H \in \mathbb{C}^{N_T \times N_R}$ is the channel matrix, and v is the white Gaussian noise with an unknown variance $\sigma^2$, and K is the number of training signals. Here, we consider to use either phase shifters or switches. For the phase shifter, $p_k$ and $q_k$ are selected from the elements $\{\pm 1, \pm j\}$, while $p_k$ and $q_k$ are binary selection vectors with a few ones (e.g., a single one) and zeros elsewhere for the switch.

Assuming a geometric channel model with $N_s$ scatterers between the BS and the MS, the channel matrix H can be expressed as $$H = \sum_{i=1}^{N_s} \alpha_i \alpha_{BS}(\theta_i) \alpha_{MS}^H(\phi_i) \qquad (2)$$

where $\alpha_i$ is the complex path gain associated with the i-th path, $\theta_i$ and $\phi_i$ are the associated angular AoD and AoA, respectively, $\alpha_{BS}(\theta_i)$ and $\alpha_{MS}(\phi_i)$ denote the array response vectors associated with the BS and the MS, respectively. In the case of a uniform linear array (ULA), the steering vectors can be written in terms of the spatial frequency $\omega$ and $\psi$ $$\alpha_{BS}(\theta) = \alpha_{BS}(\omega) = \frac{1}{\sqrt{N_T}}[1, e^{j\omega}, \ldots, e^{j(N_T-1)\omega}]^T, \qquad (3)$$

$$\alpha_{MS}(\phi) = \alpha_{MS}(\psi) = \frac{1}{\sqrt{N_R}}[1, e^{j\psi}, \ldots, e^{j(N_R-1)\psi}]^T,$$

where $\omega=2\pi d \sin(\theta)/\lambda$ and $\psi=2\pi d \sin(\phi)/\lambda$ with d denoting the inter-element spacing of the array and $\lambda$ the wavelength. The present disclosure considers the problem of estimating the channel path gain $\alpha_i$ and its associated spatial frequencies, i.e., $\omega$ and $\psi$ from the K measurements $y_k$, k=1, 2, ..., K.

This sparse channel feature can be utilized to formulate the channel estimation problem as a sparse signal recovery along with the channel sensing scheme in (1). To see this, we decompose the channel matrix into an overcomplete virtual angular channel model $$H = A_{MS} H_v A_{BS}^H \qquad (4)$$

where $A_{MS}=[\alpha_{MS}(\psi_1), \ldots, \alpha_{MS}(\psi_{N_A})]$ is an overcomplete matrix (i.e., $N_A \gg N_s$) with each column representing the steering vector at a pre-discretized AoA spatial frequency, $A_{BS}=[\alpha_{BS}(\omega_1), \ldots, \alpha_{BS}(\omega_{N_D})]$ represents the steering matrix at pre-discretized AoD spatial frequencies with $N_D \gg N_s$, and $H_v$ is a sparse matrix with $N_s$ non-zero entries corresponding to the channel path gain in (1). The overcomplete virtual channel representation of (4) further assumes that the spatial frequencies of the $N_s$ scatterers fall into the pre-discretized grids of the AoD ($[\omega_1, \ldots, \omega_{N_D}]$) and AoA ($[\psi_1, \ldots, \psi_{N_A}]$).

The virtual angular domain can be pictorially represented as a two-dimensional grid 300, in which the DoA and DoD are represented with angles of arrival (AoA) 301 and angles of departure (AoD) 302 along the axis. A non-zero patch of energy 310 at, for example, AoA $\theta_2$ 311 and AoD $\phi_2$ 313, indicates that there is a path in a mmWave channel such that a signal transmitted in the beam in the direction $\phi_2$ and with width $\Delta\phi_2$ 314 reaches receiver from the direction of $\theta_2$ and has angular spread $\Delta\theta_1$ 312. The virtual angular representation of a mmWave channel shown in FIG. 3A indicates that there are two angular-spread paths 310 and 320 between transmitter and receiver where each transmitted and received beam has some angular spread.

Several real-world measurements in dense-urban propagation environments reveal that mmWave channel may spread in the form of cluster of paths over the angular domains including the AoD, AoA and elevation. The angular spread may exacerbate as the spatial resolution becomes finer when the number of antennas at the BS and MS increases, which is highly likely when the massive MIMO is fused with the mmWave transmission. Spatial channel models have been statistically proposed from real-world measurements at 28 and 73 GHz in New York city, and they provide a realistic assessment of mmWave micro- and picocellular networks in a dense urban deployment. Specifically, the angular spread (or angular dispersion) of path clusters has been explicitly studied in terms of the root mean-squared (rms) beamspread in the different angular (AoA, AoD, and elevation) dimensions. The AoA spreads are 15.5 deg and 15.4 deg, respectively, for the two carrier frequencies, while corresponding AoD spreads are 10.2 deg_ and 10.5_deg, respectively.

Figures 3B, 3C:
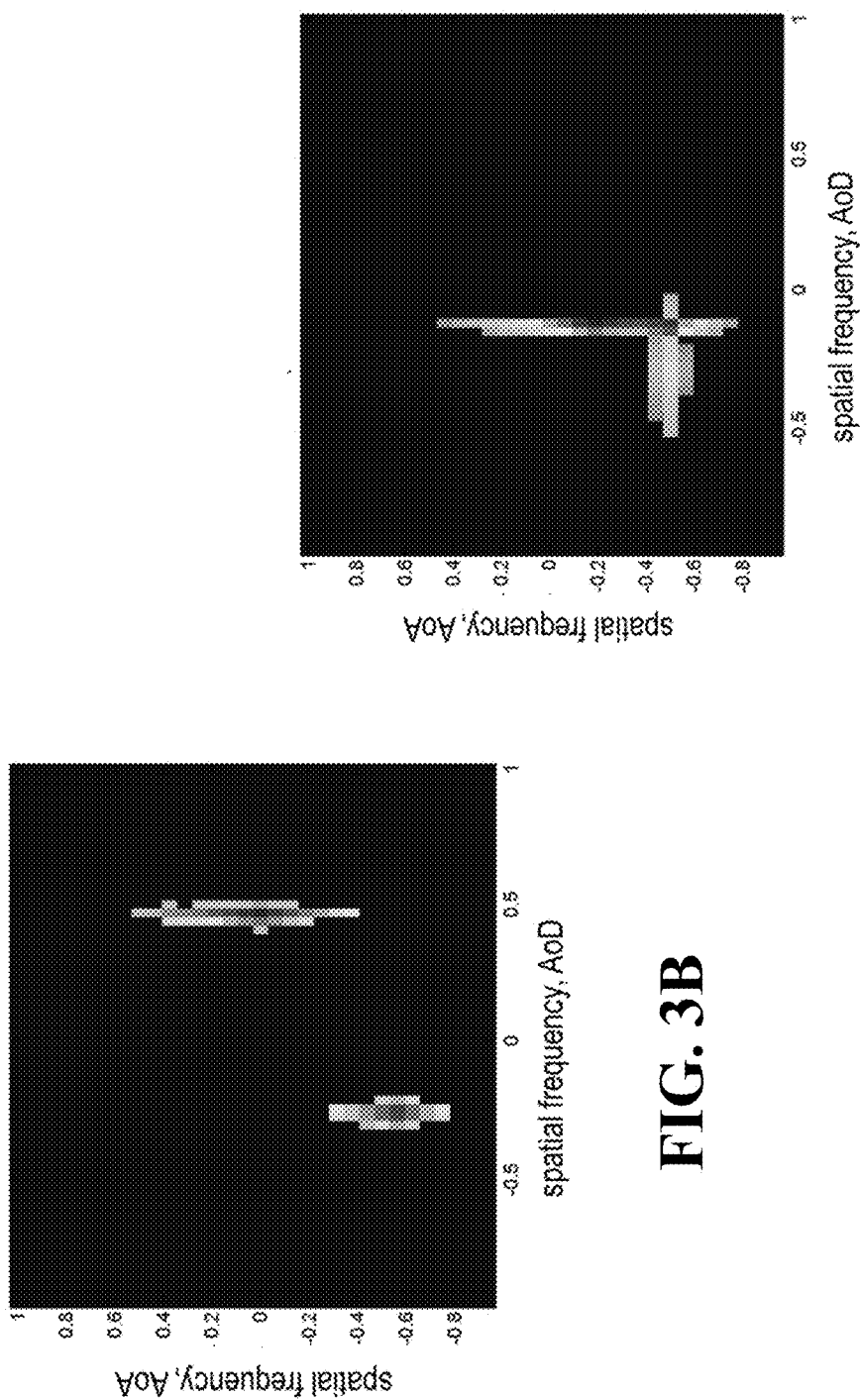
FIG. 3B and FIG. 3C show a schematic of channel path power profiles in two scenarios of joint AoD-AoA angular spread.

FIG. 3B and FIG. 3C show a schematic of channel path power profiles in two scenarios of joint AoD-AoA angular spread: FIG. 3B illustrates scenario 1, two separated path clusters with AoA spreads larger than AoD spreads; and FIG. 3C, illustrates scenario 2, two intersecting path clusters with one spreading over the AoD and the other spreading along the AoA, according to some embodiments of the present disclosure.

Because the mmWave channel is sparse in the number of paths between transmitter and receiver, some embodiments formulate the channel estimation problem as a problem of sparse representation of the received channel sensing signals in a redundant dictionary. The redundant dictionary includes atoms which depend on the transmitter and receiver manifold vectors. To that end, the channel can be estimated by employing one of a variety of sparse recovery methods, such as orthogonal matching pursuit (OMP) method.

Figure 4:
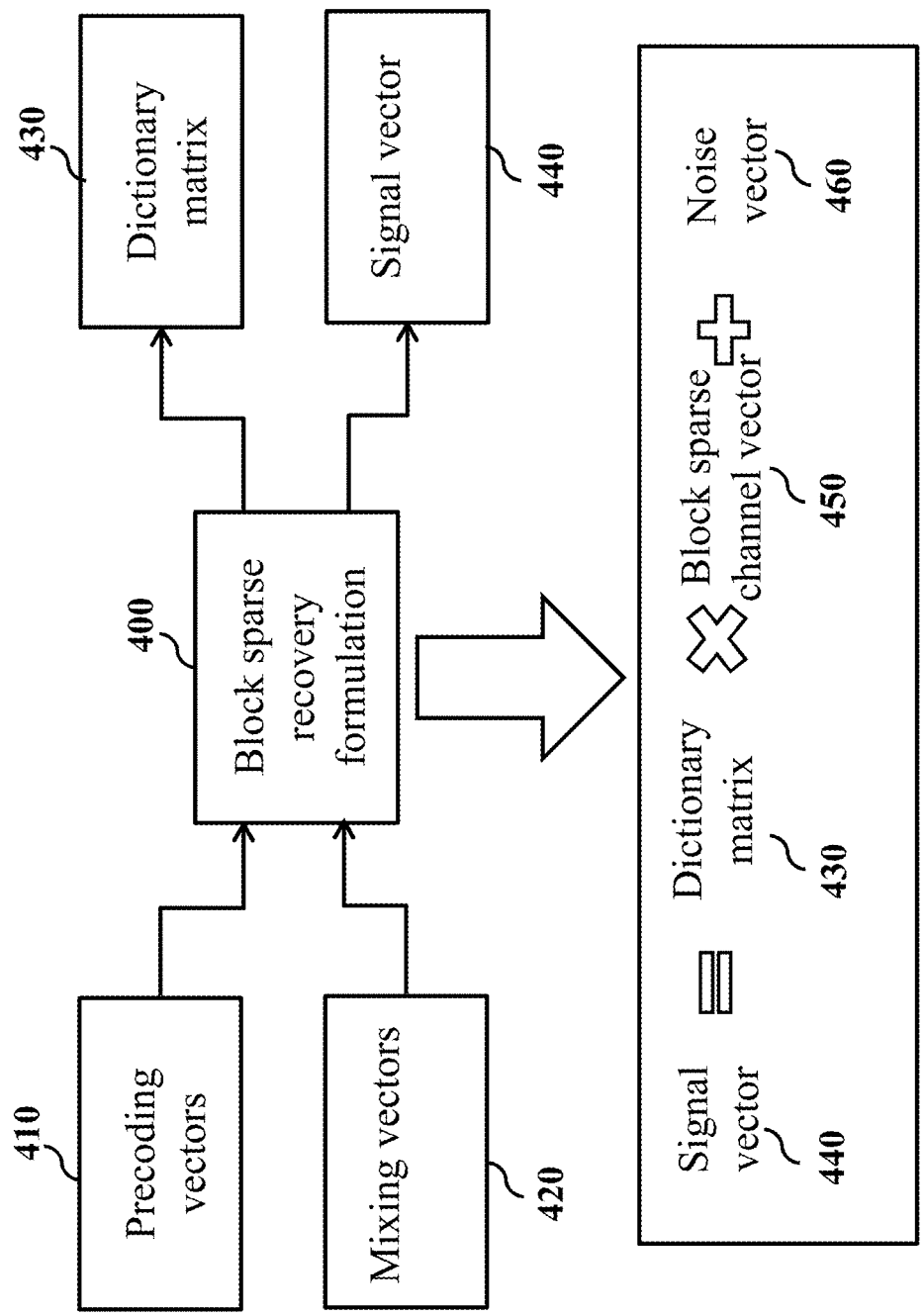
FIG. 4 shows a block diagram of a block sparse recovery methods of the channel estimation, according to one embodiment of the present disclosure.
Figure 5:
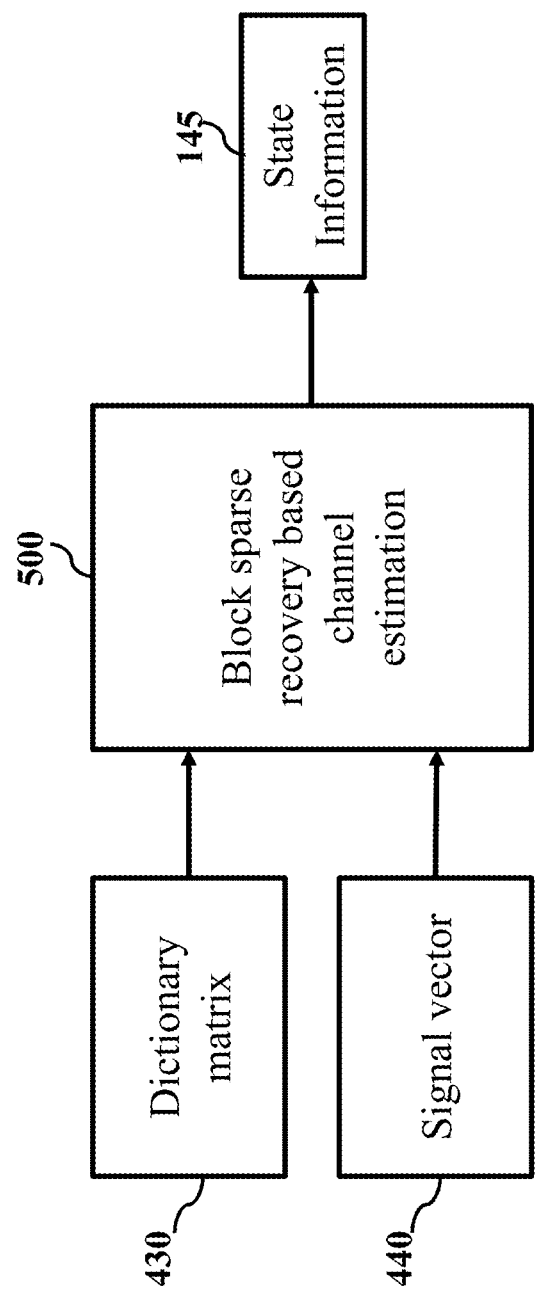
FIG. 5 shows a block diagram of a method for estimating state of the mmWave channel using block sparse recovery methods according to some embodiments of the present disclosure.

FIG. 4 shows a block diagram of block sparse recovery methods of the channel estimation according to one embodiment of the present disclosure. The signal vector 440 can be obtained after pre-processing the test symbol received on a receiver array. The signal vector is represented as a product of a wide dictionary matrix 430 and a block sparse channel vector 450, modified with noise 460. This representation can be obtained by transmitting a test symbol, e.g., a symbol with a known value one, after precoding the test symbol using a certain number of precoding vectors 410 and processing the received signal with a certain number of mixing vectors 420.

In some embodiments, non-zero elements of the channel vector include the coefficients of the channel state information, wherein values of the signal vector and the dictionary matrix are known from the test symbol and transmitter and receiver manifold vectors. For example, one embodiment determines the dictionary matrix and the signal vector from the precoding and mixing vectors, as well as transmitter and receiver manifold vectors, using various algebraic operations which encompass sparse recovery formulation 400.

For example, suppose a transmitter sends a data symbol t=1 and applies precoding vectors $\{p_i\}_{i=1}^m$ in m successive time steps. The precoding vectors are of size equal to the number of transmitter antenna elements and, in general, may contain random or pseudo-random complex exponentials. The receiver employs corresponding mixing vectors $\{q_i\}_{i=1}^m$ to the signals received on its antenna elements. The mixing vectors are of size equal to the number of employed antenna elements and may contain random or pseudo-random complex exponentials.

Note that $\text{vec}(H)=(A_{BS}^* \otimes A_{MS}^H)$ h with $h=\text{vec}(H_v) \in \mathbb{C}^{N_D N_A \times 1}$ denoting the sparse vector with $N_s$ non-zero entries. Plugging (4) back to (1) yields $$y_k = \sqrt{\rho}\,(p_k^T \otimes q_k^H)\text{vec}(H) + q_k^H v, k = 1, 2, \ldots, K, \quad (5)$$
$$= \sqrt{\rho}\,(p_k^T \otimes q_k^H)(A_{BS}^* \otimes A_{MS}^H)h + q_k^H v$$
$$= \sqrt{\rho}\,(p_k^T \otimes q_k^H)\Psi h + q_k^H v,$$

where $\Psi = A_{BS}^* \otimes A_{MS}^H$. Grouping all K measurements, we have $$y = \begin{bmatrix} y_1 \\ y_2 \\ \vdots \\ y_K \end{bmatrix} = \sqrt{\rho}\begin{bmatrix} p_1^T \otimes q_1^H \\ p_2^T \otimes q_2^H \\ \vdots \\ p_K^T \otimes q_K^H \end{bmatrix}\Psi h + \begin{bmatrix} q_1^H v \\ q_2^H v \\ \vdots \\ q_K^H v \end{bmatrix} = Ah + e. \quad (6)$$

where we refer to y as signal vector 440, A is dictionary matrix 430, x is a block sparse channel vector 450, and e is noise vector 460. We reiterate that the signal vector and dictionary matrix are computed from the precoding and mixing vectors, as well as from the transmitter and receiver manifold vectors. The channel estimation problem then boils down to finding a sparse representation of the signal vector 440 in the redundant dictionary 430, where the coefficients of the block sparse representation constitute unknown channel vector 450. The estimated channel vector is then mapped back to the representation in the virtual angular domain $H_s$, which, in turn, is mapped to channel matrix H, using (1).

To further exploit the two-dimensional joint AoD-AoA spread, the channel estimation can be straightforwardly formulated as a two-dimensional block-sparse signal recovery problem, where the block-sparsity is now in the joint AoD-AoA domain.

Block-sparse signal recovery has been studied recently in the literature; for instance, the group LASSO, the mixed $l_2/l_1$ program, and the block OMP. However, these methods require a priori knowledge of block patterns including the block size and its location. For the problem concerned here, such information is usually not available in advance.

Adaptive block-sparse signal recovery algorithms with capability of learning the block pattern are more suitable for the problem here. These algorithms introduce block/graphical priors to model the statistical dependencies between atoms. However, these priors usually lead to intractable posterior distribution and computationally intensive sampling methods have to be used.

Figure 6:
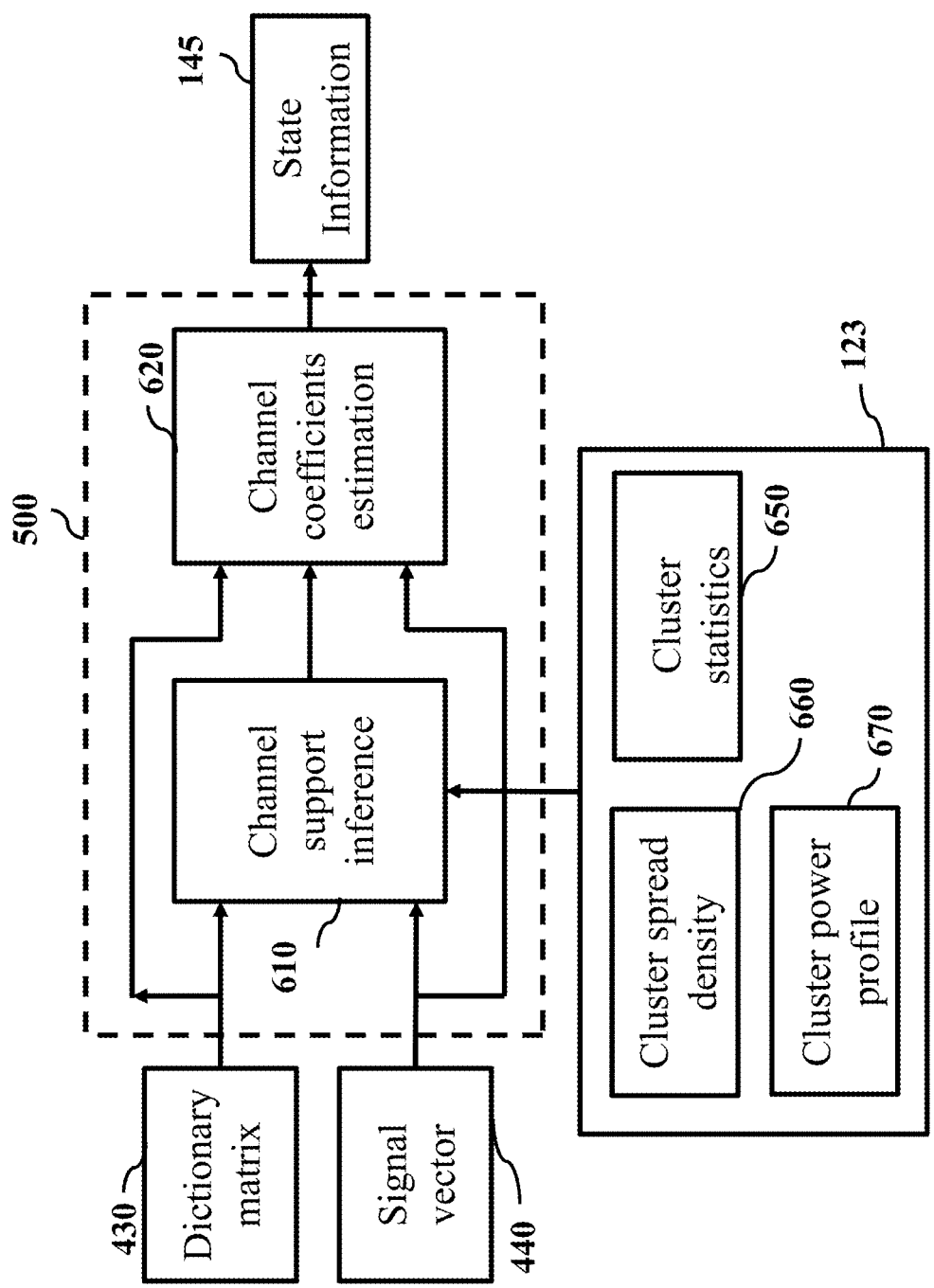
FIG. 6 shows a block diagram of a two-stage method for determining the state information 145 according to one embodiment of the present disclosure.

FIG. 6 shows a block diagram of a two-stage method for determining the state information 145 according to one embodiment of the present disclosure. In the first stage 610 (channel support interference) in the block sparse recovery based channel estimation 500, the embodiment determines the non-zero support of the channel vector. In other words, this stage 610 finds which entries in a sparse and long channel vector are indeed non-zero. In doing so, the dictionary matrix 430, signal vector 440 and channel model 123 are exploited.

In the channel model 123, we address the cluster spread 660, cluster power profile 670 and the cluster statistics 650. The cluster spread 660 refers to the angular spread extent in the AoA and AoD domains. The cluster power profile is the channel propagation strength over the AoA and AoD domains. The cluster statistics 650 is the distribution of the instantaneous channel coefficients.

Figure 7A:
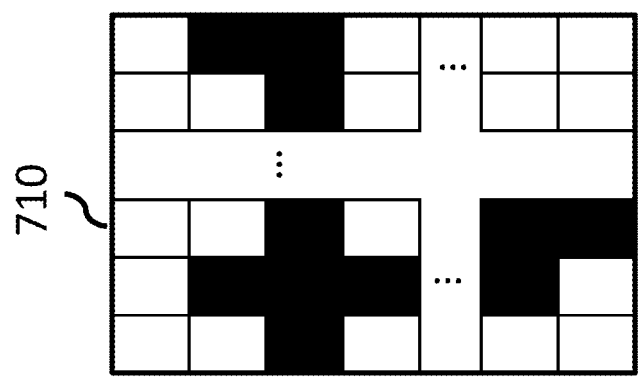
FIG. 7A shows a block diagram of various two-dimensional angular spread clusters of propagation paths, according to one embodiment of the present disclosure.
Figure 7B:
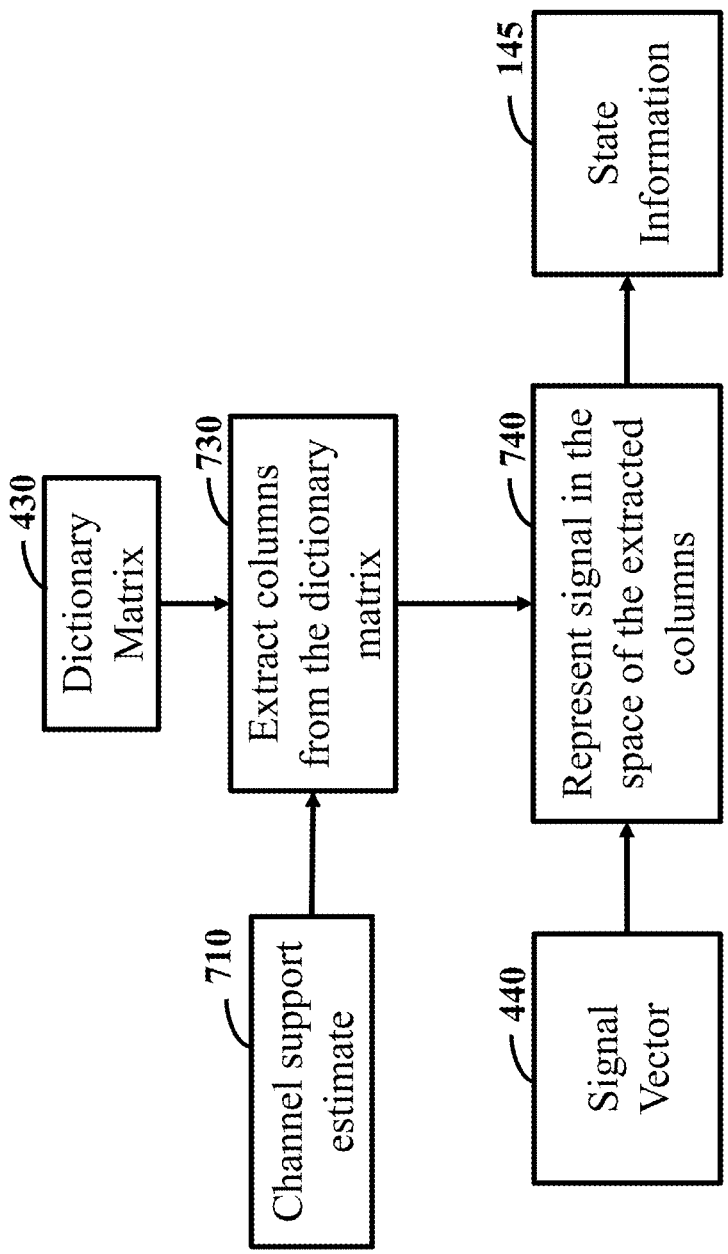
FIG. 7B shows a block diagram for evaluating the two-dimensional angular spread clusters of propagation paths of FIG. 7A, according to one embodiment of the present disclosure.

Regarding FIG. 7A and FIG. 7B, FIG. 7A shows a block diagram of several simple two-dimensional angular spread patterns of propagation paths, according to one embodiment of the present disclosure. FIG. 7B shows a block diagram for evaluating the two-dimensional angular spread clusters of propagation paths support of FIG. 7A support according to one embodiment of the present disclosure.

FIG. 7A illustrates several building blocks 710 for the two-dimensional angular spread over the AoA and AoD domains. With the estimated channel paths 710 from a block sparse recovery method, FIG. 7B illustrates follow-up estimates of the channel state information. Particularly, we can first identify the columns 730 corresponding to the estimated channel support 710 and then represent signal over the extracted columns 740 for estimating the channel state information 750.

The present disclosure provides a two-dimensional coupled sparse Bayesian learning (SBL) algorithm to exploit the joint AoD-AoA angular spread for the mmWave channel estimation. The coupled SBL algorithm treats the channel gain of each path as a random variable and imposes a two-dimensional statistical dependence across the channel path power to favor block-sparse solutions without knowing the block pattern a priori. The proposed algorithm encompasses two steps and iterates between them: the Bayesian estimation of the channel gain matrix followed by iteratively updating the prior variance (or, equivalently, the channel path power) by using the expectation-maximization (EM) algorithm. Compared with several existing sparse channel estimation methods, the proposed algorithm shows numerical advantages such as reduced training overhead and lower estimation errors for the mmWave channel estimation, among other things.

Specifically, the present disclosure shows how to formulate the mmWave channel estimation problem with a hierarchical Gaussian signal model with coupled prior variances, and then derive Bayesian inference algorithms.

Recall the signal model where $A \in \mathbb{C}^{K \times N_D N_A}$, h is the vectorized complex channel gain matrix $$h = [h_1, \ldots, h_N]^T = \text{vec}\{H_v\}, H_v \in \mathbb{C}^{N_A \times N_D}, \quad (7)$$

With $N = N_D N_A$, and $e \in \mathbb{C}^{K \times 1}$ is the noise vector. Then a standard hierarchical Gaussian prior model is assumed for the channel gain vector h. First, the entries of h, i.e., the complex channel gain $h_n$, are assumed to be, conditioned on its variance, independently Gaussian distributed with zero mean and variance $\lambda_n$:

$$h_n | \alpha_n \sim CN(0, \alpha_n^{-1}). \quad (8)$$

where $\alpha_n = 1/\lambda_n$ denotes the precision (i.e., the reciprocal of the variance) of $h_n$. It is worthy noting that the prior variance $\lambda_n$ represents the channel gain power associated with the n-th path. It is also seen from that the channel path gain $h_n$ becomes zero when its corresponding $\alpha_n$ goes to infinity (or the corresponding variance $\lambda_n$ goes to zero). Invoking the independence across the entries, we have $$p(h | \alpha) = \prod_{n=1}^{N} p(h_n | \alpha_n). \quad (9)$$

To allow statistical learning on $\alpha_n$, the hierarchical Gaussian prior model further assumes that the prior precisions are also random variables that follow the i.i.d. Gamma distribution $$p(\alpha_n | \mu, v) = \frac{1}{\Gamma(\mu)} v^\mu \alpha_n^{\mu-1} e^{-v\alpha_n}, \text{ with } \alpha_n \geq 0. \quad (10)$$

where $\Gamma(\mu) = \int_0^\infty t^{\mu-1} e^{-t} dt$ is the Gamma function, $\mu$ is the shape parameter, and $v$ is the inverse shape parameter. We might fix these small values to the hyper-hyperparameters: e.g., $\mu = v = 10^{-4}$ to make these priors non-informative. It is easy to show that, with the Gamma distribution on $\alpha_n$ and the conditional Gaussian distribution, the prior distribution of $h_n$ reduces to the Student-t distribution $$p(h_n) = \int p(h_n | \alpha_n) p(\alpha_n) d\alpha_n \sim e^{(\mu + h_n^2/2)^{-v+0.5}}, \quad (11)$$

which inherently promotes a sparse solution on h.

Figure 8B:
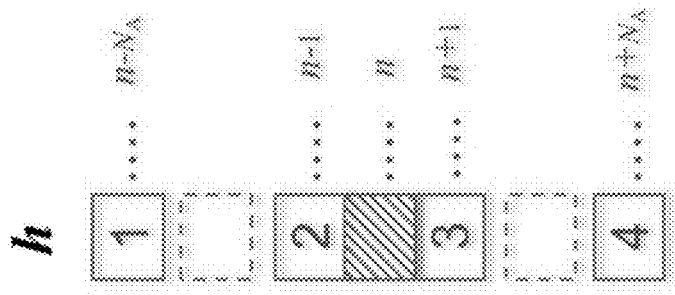
FIGS. 8A and 8B, FIG. 8A shows a building block of a 2-D coupled pattern, and FIG. 8B show its equivalent 1-D coupled pattern for the clustered sparse mmWave channel estimation, according to one embodiment of the present disclosure.
Figure 8A:
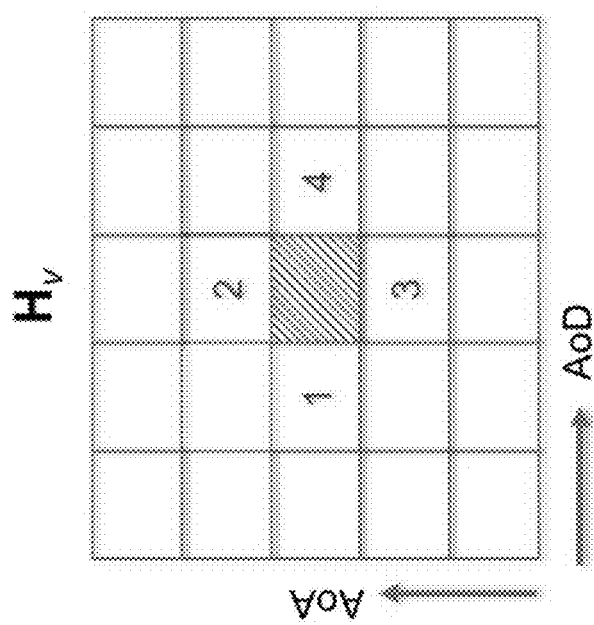

To exploit the statistical dependencies across entries, we can introduce a coupled pattern on the hyperparameters, i.e., prior precisions. More precisely, the prior of each entry not only involves its own hyperparameter, but also the hyperparameters of its immediate neighbors on the 2-D AoD-AoA grids. Specifically, we have $$p(h | \alpha) = \prod_{n=1}^{N} p(h_n | \alpha_n, \alpha_{\mathbb{N}(n)}). \quad (12)$$

where $\mathbb{R}(n)$ denotes the indices of a defined neighboring grids to the grid n and $$h_n | \alpha_n, \alpha_{\mathbb{R}(n)} \sim CN(0, (\alpha_n + \beta f(\alpha_{\mathbb{R}(n)}))^{-1}) \quad (13)$$

where $\beta$ is the coupling coefficient and $f(\bullet)$ is a function of the prior precisions at the neighboring grids $\mathbb{R}(n)$ of the index n. For instance, for a given grid n, we define its neighboring grids in the AoD-AoA domain as the four step-one grids (numbered from 1 to 4) in FIG. 8A. Due to the vectorization, the neighboring index set in the vector is, hence, $\mathbb{R}(n) = \{n - N_A, n-1, n+1, n+N_A\}$, as shown in FIG. 8B. The coupling coefficient $\beta$ quantitatively describes the statistical dependence between each entry $h_n$ and its 2-D neighboring entries $h_{N(n)}$. When $\beta = 0$, the coupled building block reduces to the conventional uncoupled model.

The choice of the coupling function $f(\bullet)$ can be flexible. One choice of $f(\bullet)$ is a simple summation over the neighboring precisions, $$\theta(\alpha_{\mathbb{R}(n)}) = \alpha_{n-N_A} + \alpha_{n+N_A} + \alpha_{n-1} + \alpha_{n+1}. \quad (14)$$

To further capture the smooth decay of the channel power along the AoD and AoA domains, one may use the following coupled total variation functions $$f(\alpha_{\mathbb{R}(n)}) = |\alpha_{n-N_A} - \alpha_{n+N_A}| + |\alpha_{n-1} - \alpha_{n+1}| \quad (15)$$

$$f(\alpha_{\mathbb{R}(n)}) = |\alpha_{n-N_A} - \alpha_n| + |\alpha_n - \alpha_{n+N_A}| + |\alpha_{n-1} - \alpha_n| + |\alpha_n - \alpha_{n+1}|, \quad (16)$$

where $|\alpha_{n-N_4}-\alpha_n|$ captures the channel power variation along the AoD domain, $|\alpha n_{-1}-\alpha_n|$ along the AoA domain, and the summation between these two terms imposes the dependence of the four neighboring grids on the current grid.

First the inference on the basis coefficient vector h is derived from the measurements y, provided that the hyperparameters (the prior precision $\alpha_n$ and the noise variance $\sigma^2$) are known. Then the inference on the hyperparameters can be obtained by using the EM algorithm.

First, one can compute the posterior distribution of h as $$p(h|y,\alpha) \propto p(y|h)p(h|\alpha) \quad (17)$$

where $y|h \sim CN(Ah,\rho^2 I)$ and $p(h|\alpha)$. It is easy to infer that the posterior distribution of h is a complex Gaussian distribution given by $$h|y,\alpha \sim CN(\mu,\Sigma) \quad (18)$$

where $$\mu = \sigma^{-2} \Sigma A^H y,$$

$$\Sigma = (\sigma^{-2} A^H A - \Lambda)^{-1} \quad (19)$$

with $\Lambda$ is a diagonal matrix with its n-th diagonal entry given as $$[\Lambda]_{nn} = \alpha_n + \beta f(\alpha \mathbb{R}_{(n)}). \quad (20)$$

From (18), the Bayesian MAP estimate of h, also the MMSE estimate here, is given by the posterior mean $$\hat{h} = \mu = \sigma^{-2} \Sigma A^H y, \quad (21)$$

provided that the prior precisions $\alpha$ (via $\Lambda$ in $\Sigma$) and the noise variance $\sigma^2$ are known.

The second step is to derive an update rule for the prior precisions. Note, for better exposure of our derivations, we focus here on the derivation for updating the prior precisions only. The derivation can be straightforwardly extended to the case when the noise variance is unknown. To this purpose, we adopt the EM algorithm to estimate the hyperparameters $\{\alpha_n\}_{n=1}^N$, which maximizes the posterior probability $p(\alpha|y)$ by treating the channel vector h as a hidden variable and maximizing the expected value of the complete log-posterior of $\alpha$. Specifically, it has two steps: the expectation (E) step and the maximization (M) step.

The E-step computes the expected value of the complete log-posterior of $\alpha$, also defined as the Q-function, over the hidden variable h, provided the measurements y and the current estimate of $\alpha^{(l)}$ from the previous iteration. From the above signal model, the Q-function is given as $$Q(\alpha) = E_{h|y,\alpha^{(l)}} \log p(\alpha|h) \propto \int \log[p(h|\alpha)p(\alpha)]p(h|y,\alpha)dh \quad (22)$$

With $p(h|\alpha)$, $p(\alpha_n)$ and the posterior distribution and defining $\eta_n = \alpha_n + \beta f(\alpha \mathbb{R}_{(n)})$ we have $$Q(\alpha) \propto \log p(\alpha) + \sum_{n=1}^N \left[\log \eta_n - \eta_n \int p(h|y,\alpha)|h_n|^2 dh\right] \overset{(a)}{\propto} \quad (23)$$

$$\sum_{n=1}^N [(\mu-1)\log \alpha_n - \nu \alpha_n + \log \eta_n - \eta_n(|\mu_n|^2 + [\Sigma]_{nn})]$$

where (a) is due to the Gamma distribution of $\alpha$ and the posterior distribution of h|y, $\alpha$.

Next, the M-step is to maximize the above Q-function to find a new estimate of $\alpha$, i.e., $$\alpha^{(l+1)} = \underset{\alpha}{\arg\max}\, Q(\alpha|\alpha^{(l)}) \quad (24)$$

Due to the coupled structure, i.e., $\log(\alpha_n + \beta f(\alpha \mathbb{R}_{(n)}))$, the maximization of the Q-function cannot be decoupled into a number of separable optimizations as the traditional SBL. Even for the simple coupled function of (14), an exact solution to (24) cannot be found in closed form. As a result, gradient descend methods can be used to search for the optimal solution.

Features

Aspects of the present disclosure include determining a set of multi-dimensional spreading models for different types of the environment for propagating the mmWave.

According to the present disclosure, the mmWaves propagating in the mmWave channel are spread upon arrivals and departures, such that the mmWaves are detected as clusters of the mmWaves at the receiver. Wherein the space of propagation of the mmWaves is a Carterisan product of a set of angles of directions of departure (DoD) of the mmWaves and angles of directions of arrivals (DoA) of the mmWaves. Further, the block sparse signal recovery can include determining a support of the mmWave channel defining portions of a space of propagation of the mmWaves where the mmWave channel has non-zero energy; and determining coefficients of the state information corresponding to the portions of the space of propagation having non-zero energy. Such that the coefficients of the state information are probabilistic, in such that the channel gain element is complex Gaussian distributed with zero mean and an unknown variance such as a channel power. Wherein the support and coefficients of the state information are determined by a coupled sparse Bayesian learning algorithm for the mmWave channel estimation while using the joint AoD and the AoA angular spread. Such that, the coupled sparse Bayesian learning algorithm uses at least one coupling function, to use features of the mmWave channel, such as a smooth decay of a channel path power along the AoA or AoD domain.

According to the present disclosure, the multi-dimensional spreading model has statistics on multi-dimensional paths including a path spread for an elevation and a path spread for a delay.

According to aspects of the present disclosure, may include using a user input provided on a surface of at least one user input interface and received by the processor, wherein the user input can relate to determining a set of multi-dimensional spreading models for different types of the environment for propagating the mmWave.

Experiments

We now present simulation results to compare the proposed channel estimation algorithm with existing algorithms. Particularly, we consider a) the basis pursuit denoising (BPDN) or the LASSO with the SPGL1 solver and (b) the group LASSO (implemented by using the SPGL1-Group solver) with given block patterns. We consider a system model consisting of 64 ULA antennas at the BS and 32 ULA antennas at MS. The mmWave channel is assumed to follow a geometric channel model with the AoAs and AoDs distributed in $[-\pi/2, \pi/2]$. To illustrate the performance, we run 100 independent Monte-Carlo simulations for the two scenarios with angular path power profiles given in FIG. 2. For each Monte-Carlo run, the two-dimensional channel gain matrix $H_v$ (and hence the corresponding channel vector h) is generated as a complex sub-Gaussian matrix with zero mean and variance given by the angular path power specified in FIG. 1. The signal-to-noise ratio (SNR) is defined as SNR=$\|Ah\|_2^2/(K\sigma^2)$ where $\sigma^2$ is the variance of the noise vector.

Figure 9A:
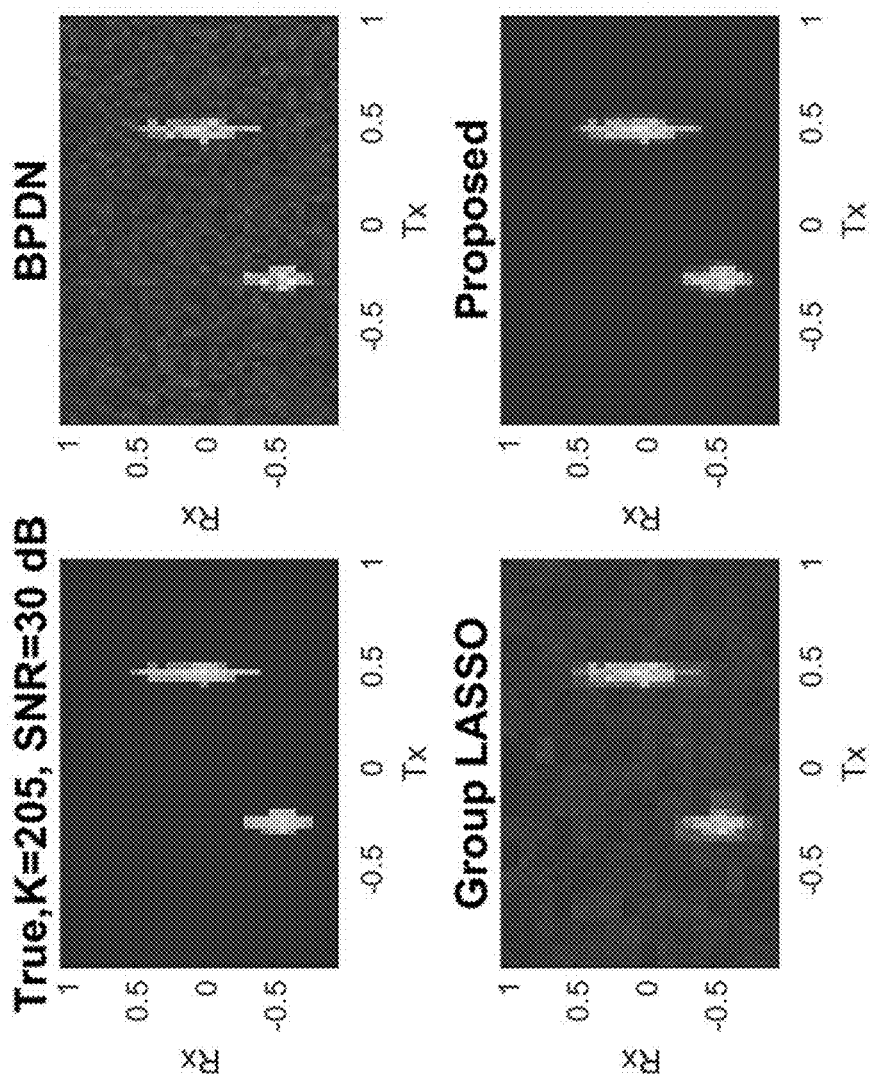
FIG. 9A shows the experimental result for Scenario 1—2 path clusters and 57 paths: the estimated channel gain matrix over the two-dimensional AoD-AoA domain with K=205 training signals and SNR=30 Db, according to experiments of the present disclosure.

First, we consider the scenario in FIG. 3A, referred to as Scenario 1 here, with two separated path clusters spreading in the AoA domain. FIG. 9A shows the estimated channel gain matrix by averaging the result from 100 Monte-Carlo runs with K=205 training signals and SNR=30 dB. In this case, the number of significant paths is 57. It is clear to see that the proposed method is able to preserve the two-dimensional path clusters better than the existing channel estimation methods as the proposed channel estimation method favors the clustered solution.

Figure 9B:
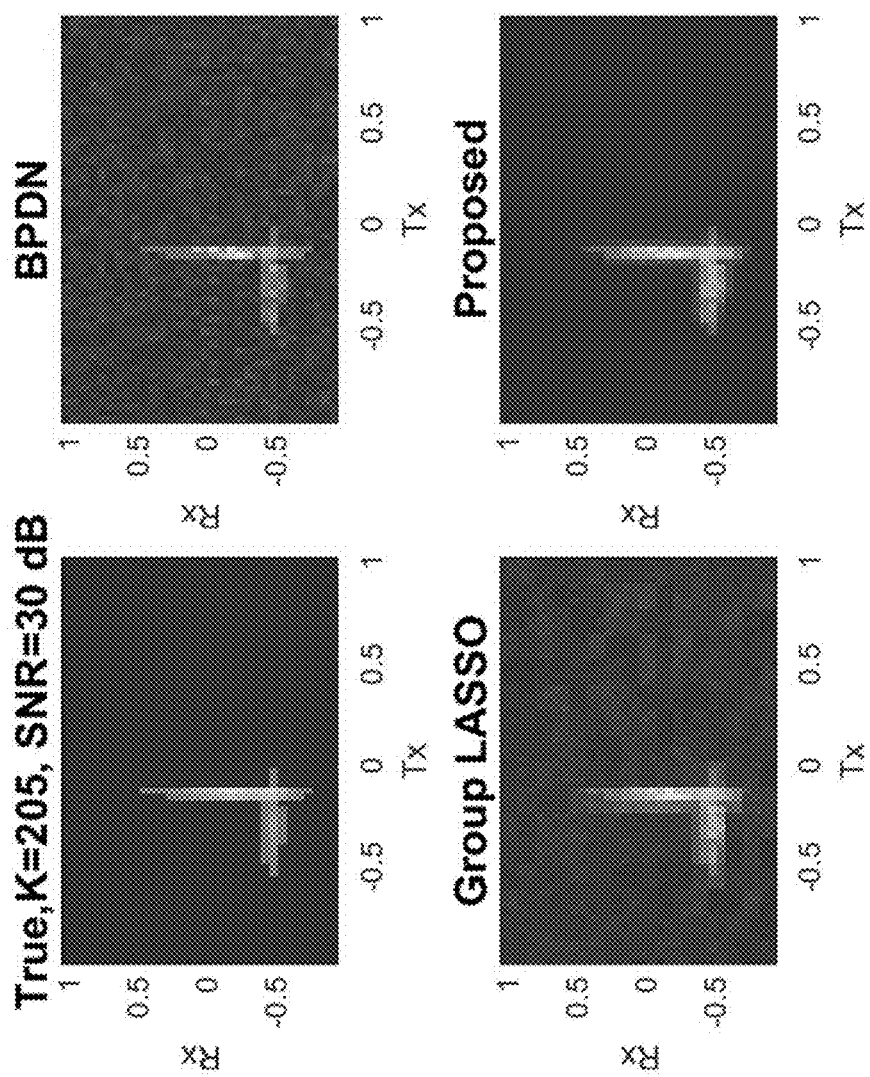
FIG. 9B shows the experimental result for Scenario 2—2 path clusters and 67 paths: the estimated channel gain matrix over the two-dimensional AoD-AoA domain with K=205 training signals, according to experiments of the present disclosure.

Next, we consider the scenario in FIG. 3B, referred to as Scenario 2 here. FIG. 9B shows the estimated channel gain matrix over the two-dimensional AoD-AoA domain from 100. Monte-Carlo runs when K=205. The number of significant paths is 67 in this case. Again, it is seen that the proposed method gives the more clustered channel gain matrix than the other considered methods.

Figure 10:
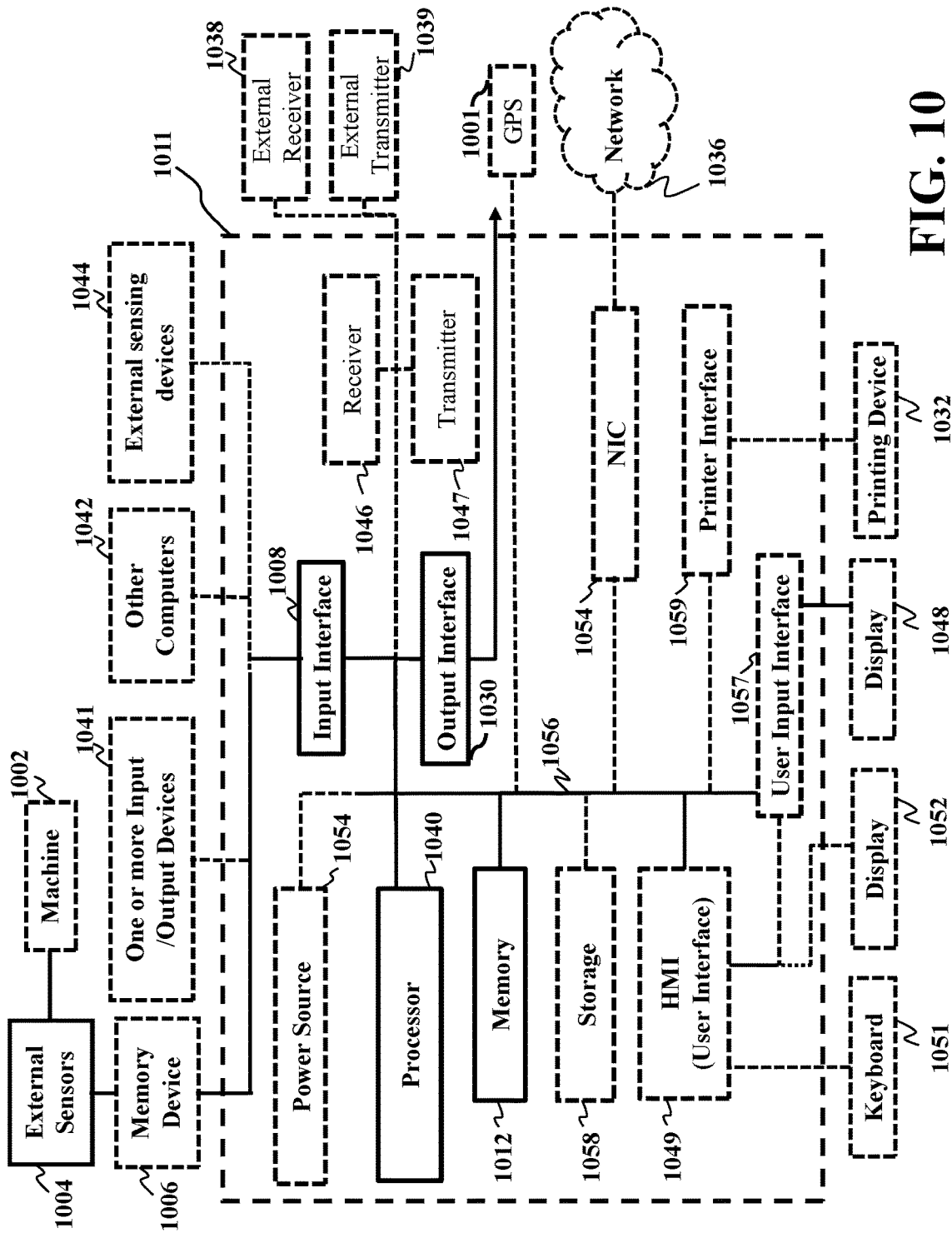
FIG. 10 is a block diagram of illustrating the method of FIG. 1A, that can be implemented using an alternate computer or processor, according to embodiments of the present disclosure.

FIG. 10 is a block diagram of illustrating the method of FIG. 1A, that can be implemented using an alternate controller, according to embodiments of the present disclosure. The controller 1011 includes a processor 1040, computer readable memory 1012, storage 1058 and user interface 1049 with display 1052 and keyboard 1051, which are connected through bus 1056. For example, the user interface 1049 in communication with the processor 1040 and the computer readable memory 1012, acquires and stores the data in the computer readable memory 1012 upon receiving an input from a surface, keyboard surface, of the user interface 1057 by a user.

Contemplated is that the memory 1012 can store instructions that are executable by the processor, historical data, and any data to that can be utilized by the methods and systems of the present disclosure. The processor 1040 can be a single core processor, a multi-core processor, a computing cluster, or any number of other configurations. The processor 1040 can be connected through a bus 1056 to one or more input and output devices. The memory 1012 can include random access memory (RAM), read only memory (ROM), flash memory, or any other suitable memory systems.

Still referring to FIG. 10, a storage device 1058 can be adapted to store supplementary data and/or software modules used by the processor. For example, the storage device 1058 can store historical data and other related data as mentioned above regarding the present disclosure. Additionally, or alternatively, the storage device 1058 can store historical data similar to data as mentioned above regarding the present disclosure. The storage device 1058 can include a hard drive, an optical drive, a thumb-drive, an array of drives, or any combinations thereof.

The system can be linked through the bus 1056 optionally to a display interface (not shown) adapted to connect the system to a display device (not shown), wherein the display device can include a computer monitor, camera, television, projector, or mobile device, among others.

The controller 1011 can include a power source 1054, depending upon the application the power source 1054 may be optionally located outside of the controller 1011. Linked through bus 1056 can be a user input interface 1057 adapted to connect to a display device 1048, wherein the display device 1048 can include a computer monitor, camera, television, projector, or mobile device, among others. A printer interface 1059 can also be connected through bus 1056 and adapted to connect to a printing device 1032, wherein the printing device 1032 can include a liquid inkjet printer, solid ink printer, large-scale commercial printer, thermal printer, UV printer, or dye-sublimation printer, among others. A network interface controller (NIC) 1034 is adapted to connect through the bus 1056 to a network 1036, wherein data or other data, among other things, can be rendered on a third party display device, third party imaging device, and/or third party printing device outside of the controller 1011.

Still referring to FIG. 10, the data or other data, among other things, can be transmitted over a communication channel of the network 1036, and/or stored within the storage system 1058 for storage and/or further processing. Further, the data or other data may be received wirelessly or hard wired from a receiver 1046 (or external receiver 1038) or transmitted via a transmitter 1047 (or external transmitter 1039) wirelessly or hard wired, the receiver 1046 and transmitter 1047 are both connected through the bus 1056. Further, a GPS 1001 may be connected via bus 1056 to the controller 1011. The controller 1011 may be connected via an input interface 1008 to external sensing devices 1044 and external input/output devices 1041. The controller 1011 may be connected to other external computers 1042. An output interface 1009 may be used to output the processed data from the processor 1040.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the present disclosure has been described by way of examples of preferred embodiments, it is to be understood that various other adaptations and modifications can be made within the spirit and scope of the present disclosure. Therefore, it is the object of the appended claims to cover all such variations and modifications as come within the true spirit and scope of the present disclosure.

What is claimed is:

1. A method for decoding a symbol transmitted over a millimeter wave (mmWave) channel, comprising:
   receiving a test symbol transmitted over the mmWave channel;
   estimating channel state information (CSI) of the mmWave channel using a block sparse signal recovery including at least one Bayesian inference method that captures a block sparsity on the test symbol according to a multi-dimensional spreading model with statistics on multi-dimensional paths including an angle of departure (AoD), angle of arrival (AoA), and a path spread for the AoD and a path spread for the AoA, by representing a virtual angular domain as a two-dimensional grid, in which the AoD, the AoA, the path spread for the AoD, and the path spread for the AoA are represented and indicating a spatial channel spread, propagating in the mmWave channel;

determining a type of an environment for propagating the mmWave in the mmWave channel;

selecting the multi-dimensional spreading model of the mmWave channel corresponding to the type of the environment for propagating the mmWave;

receiving a symbol over the mmWave channel; and decoding the symbol using the CSI, wherein steps of the method are performed by a processor of a receiver.

2. The method of claim 1, wherein the multi-dimensional spreading model has statistics on multi-dimensional paths including a path spread for an elevation and a path spread for a delay.

3. The method of claim 1, further comprising:
determining a set of multi-dimensional spreading models for different types of the environment for propagating the mmWave.

4. The method of claim 1, wherein the mmWaves propagating in the mmWave channel are spread upon arrivals and departures, such that the mmWaves are detected as clusters of the mmWaves at the receiver.

5. The method of claim 4, wherein a space of propagation of the mmWaves is a Cartesian product of a set of angles of directions of departure of the mmWaves and angles of directions of arrivals of the mmWaves.

6. The method of claim 1, wherein the block sparse signal recovery includes:
determining a support of the mmWave channel defining portions of a space of propagation of the mmWaves where the mmWave channel has non-zero energy; and
determining coefficients of the state information corresponding to the portions of the space of propagation having non-zero energy.

7. The method of claim 6, wherein the coefficients of the state information are probabilistic, in such that the channel gain element is complex Gaussian distributed with zero mean and an unknown variance such as a channel power.

8. The method of claim 6, wherein the support and coefficients of the state information are determined by a coupled sparse Bayesian learning algorithm for the mmWave channel estimation while using the joint AoD and the AoA angular spread.

9. The method of claim 8, wherein the coupled sparse Bayesian learning algorithm uses at least one coupling function, to use features of the mmWave channel, such as a smooth decay of a channel path power along the AoA or AoD domain.

10. A receiver for receiving and decoding symbols transmitted over a millimeter wave (mmWave) channel, the receiver comprising:
a set of antennas configured to receive symbols transmitted over the mmWave channel;
a front end configured to convert the symbols into a test symbol and a data symbol;
a processor configured to estimate channel state information (CSI) of the mmWave channel using a block sparse signal recovery including at least one Bayesian inference method on the test symbol according to a multi-dimensional spreading model with statistics on multi-dimensional paths including an angle of departure (AoD), angle of arrival (AoA), and a path spread for the AoD and a path spread for the AoA, propagating in the mmWave channel by representing a virtual angular domain as a two-dimensional grid, in which the AoD, the AoA, the path spread for the AoD, and the path spread for the AoA are represented and indicating a spatial channel spread;

determine a type of an environment for propagating the mmWave in the mmWave channel;

select the multi-dimensional spreading model of the mmWave channel corresponding to the type of the environment for propagating the mmWave; and a decoder configured to decode the symbol using the CSI.

11. The receiver of claim 10, wherein the receiver is configured to spread the mmWaves propagating in the mmWave channel are spread upon arrivals and departures, such that the mmWaves are detected as clusters of the mmWaves at the receiver, wherein a space of propagation of the mmWaves is a Cartesian product of a set of angles of directions of departure of the mmWaves and angles of directions of arrivals of the mmWaves.

12. A computer implemented method for decoding a symbol transmitted over a millimeter wave (mmWave) channel by using a controller, the method comprising:
estimating channel state information (CSI) of the mmWave channel using a block sparse signal recovery including at least one Bayesian inference method on a test symbol according to a multi-dimensional spreading model with statistics on multi-dimensional paths including an angle of departure (AoD), angle of arrival (AoA), and a path spread for the AoD and a path spread for the AoA, by representing a virtual angular domain as a two-dimensional grid, in which the AoD, the AoA, the path spread for the AoD, and the path spread for the AoA are represented and indicating a spatial channel spread, propagating in the mmWave channel;

determining a support of the mmWave channel defining portions of a space of propagation of the mmWaves where the mmWave channel has non-zero energy;

determining coefficients of the state information corresponding to the portions of the space of propagation having non-zero energy; and decoding a symbol received over the mmWave channel by a receiver using the CSI, wherein steps of the method are performed by a processor of the receiver.

13. The method of claim 12, wherein the multi-dimensional spreading model has statistics on multi-dimensional paths including a path spread for an elevation and a path spread for a delay.

14. The method of claim 12, wherein the support and coefficients of the state information are determined by a coupled sparse Bayesian learning algorithm for the mmWave channel estimation while using the joint AoD and the AoA angular spread.

15. The method of claim 14, wherein the coupled sparse Bayesian learning algorithm uses at least one coupling function, to use features of the mmWave channel, such as a smooth decay of a channel path power along the AoA or AoD domain.

16. A method for decoding a symbol transmitted over a millimeter wave (mmWave) channel, comprising:
receiving a test symbol transmitted over the mmWave channel;
estimating channel state information (CSI) of the mmWave channel using a block sparse signal recovery on the test symbol according to a multi-dimensional spreading model with statistics on multi-dimensional paths including an angle of departure (AoD), angle of arrival (AoA), and a path spread for the AoD and a path spread for the AoA, propagating in the mmWave channel;

determining a type of an environment for propagating the mmWave in the mmWave channel;

selecting the multi-dimensional spreading model of the mmWave channel corresponding to the type of the environment for propagating the mmWave, wherein the mmWaves propagating in the mmWave channel are spread upon arrivals and departures, such that the mmWaves are detected as clusters of the mmWaves at the receiver, such that a space of propagation of the mmWaves is a Cartesian product of a set of angles of directions of departure of the mmWaves and angles of directions of arrivals of the mmWaves;

receiving a symbol over the mmWave channel; and decoding the symbol using the CSI, wherein steps of the method are performed by a processor of a receiver.

17. The method of claim 16, wherein the block sparse signal recovery includes a group least absolute shrinkage and a selection operator (LASSO) method or at least one group greedy method such as a block orthogonal match pursuit (block OMP).

18. A receiver for receiving and decoding symbols transmitted over a millimeter wave (mmWave) channel, the receiver comprising:

a set of antennas configured to receive symbols transmitted over the mmWave channel;

a front end configured to convert the symbols into a test symbol and a data symbol;

a processor configured to estimate channel state information (CSI) of the mmWave channel using a block sparse signal recovery on the test symbol according to a multi-dimensional spreading model with statistics on multi-dimensional paths including an angle of departure (AoD), angle of arrival (AoA), and a path spread for the AoD and a path spread for the AoA, propagating in the mmWave channel;

determine a type of an environment for propagating the mmWave in the mmWave channel;

select the multi-dimensional spreading model of the mmWave channel corresponding to the type of the environment for propagating the mmWave; and a decoder configured to decode the symbol using the CSI.

19. The receiver of claim 17, wherein the block sparse signal recovery includes a group least absolute shrinkage and a selection operator (LASSO) method, at least one group greedy method such as a block orthogonal match pursuit (block OMP) or at least one Bayesian inference method that captures a block sparsity.

20. A computer implemented method for decoding a symbol transmitted over a millimeter wave (mmWave) channel by using a controller, the method comprising:

estimating channel state information (CSI) of the mmWave channel using a block sparse signal recovery on a test symbol according to a multi-dimensional spreading model with statistics on multi-dimensional paths including an angle of departure (AoD), angle of arrival (AoA), and a path spread for the AoD and a path spread for the AoA, propagating in the mmWave channel;

determining a support of the mmWave channel defining portions of a space of propagation of the mmWaves where the mmWave channel has non-zero energy;

determining coefficients of the state information corresponding to the portions of the space of propagation having non-zero energy, wherein the coefficients of the state information are probabilistic, in such that the channel gain element is complex Gaussian distributed with zero mean and an unknown variance such as a channel power; and decoding a symbol received over the mmWave channel by a receiver using the CSI, wherein steps of the method are performed by a processor of the receiver.

* * * * *